(12) United States Patent
Yoshizawa et al.

(10) Patent No.: US 10,757,610 B2
(45) Date of Patent: *Aug. 25, 2020

(54) CALL PRESERVATION ON HANDOVER

(71) Applicant: Cisco Technology, Inc., San Jose, CA (US)

(72) Inventors: Takahito Yoshizawa, Boom (BE); Indermeet Singh Gandhi, Bangalore (IN); Swaminathan A. Anantha, Mountain View, CA (US); Yuyong Zhang, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/058,798

(22) Filed: Aug. 8, 2018

(65) Prior Publication Data

US 2018/0352484 A1 Dec. 6, 2018

Related U.S. Application Data

(63) Continuation of application No. 14/456,899, filed on Aug. 11, 2014, now Pat. No. 10,104,582.

(51) Int. Cl.
*H04W 36/00* (2009.01)
*H04W 88/10* (2009.01)
(Continued)

(52) U.S. Cl.
CPC ........ *H04W 36/0016* (2013.01); *H04W 36/04* (2013.01); *H04W 84/045* (2013.01); *H04W 88/10* (2013.01); *H04W 92/20* (2013.01)

(58) Field of Classification Search
None
See application file for complete search history.

(56) References Cited

U.S. PATENT DOCUMENTS 5,335,356 A 8/1994 Andersson
6,904,025 B1 * 6/2005 Madour ............ H04W 36/0011
370/328
(Continued)

FOREIGN PATENT DOCUMENTS

CN 101754373 A 6/2010
CN 101808373 A 8/2010
(Continued)

OTHER PUBLICATIONS

National Intelletual Property Adminstration, PRC (CNIPA) Search Report for Application No. 20150490448.0 dated Jan. 10, 2019.
(Continued)

*Primary Examiner* — Sai Aung
*Assistant Examiner* — Richard Schnell
(74) *Attorney, Agent, or Firm* — Patterson + Sheridan, LLP

(57) ABSTRACT

In an example, a wireless communication system and apparatuses thereof are described. In an example long-term evolution (LTE) network, a first base station hands over a connection to a second base station. The first base station may be a (femto) home eNodeB (HeNB) or (macro) eNodeB. The second base station may also be a HeNB or eNodeB connected to a different gateway. The first base station may send "Handover Request" on an X2 connection, identifying the gateway that the second base station is connected to as the correct gateway. After sending a "Handover Request Acknowledgement," the second base station correctly establishes a tunnel to a connected gateway device.

20 Claims, 17 Drawing Sheets

(51) Int. Cl.
*H04W 36/04* (2009.01)
*H04W 84/04* (2009.01)
*H04W 92/20* (2009.01)

(56) References Cited

U.S. PATENT DOCUMENTS

| | | |
|---|---|---|
| 7,239,618 B1 | 7/2007 | La Porta |
| 8,548,476 B2 | 10/2013 | Lei et al. |
| 8,588,182 B2 | 11/2013 | Liu et al. |
| 10,104,582 B2 | 10/2018 | Yoshizawa et al. |
| 2011/0269495 A1 | 11/2011 | Hapsari |
| 2013/0089076 A1 | 4/2013 | Olvera-Hernandez |
| 2013/0150037 A1 | 6/2013 | Jha |
| 2014/0064246 A1 | 3/2014 | Baillargeon |
| 2014/0094146 A1 | 4/2014 | Xu et al. |
| 2015/0071271 A1 | 3/2015 | Smedman |
| 2016/0112945 A1 | 4/2016 | Chen |

FOREIGN PATENT DOCUMENTS

| | | |
|---|---|---|
| CN | 102111748 A | 6/2011 |
| EP | 2575391 A1 | 4/2013 |
| EP | 2986052 A1 | 2/2016 |
| WO | 2013019035 A2 | 2/2013 |

OTHER PUBLICATIONS

Wireless Communication & DSP; Ashok; Apr. 2, 2013; http://communicationanddsp.blogspot.com/2013/04/rssi-rsrp-in-lte.html.
RSRP and RSRQ Measurement in LTE, Maurizio La Rocca, MSE; Aug. 4, 2014; http://laroccasolutions.com/training/78-rsrp-and-rsrq-measurement-in-lte/-.
Lte-x2-handover-sequence-diagram, eventhelix.comhttp; Apr. 20, 2013; http://www.eventhelix.com/lte/handover/LTE-X2-Handover-Messaging.pdf.
Attenuation—About.com, Bradley Mitchell; Apr. 13, 2014; http://compnetworking.about.com/od/networkdesign/g/whatisattenuation.html-.
EPO Jan. 4, 2016 Extended Search Report and Written Opinion from European Application Serial No. 15178937; 19 pages.
Cisco Systems, et al., "Fill the spec gap for the lack of certain X2 HO scenarios involding HeNB/HeNB-GW," 3GPP TSG-WG3 Meeting #83, R3-140031, Prague, Czech Republic, Feb. 10-14, 2014; 34 pages.
Motorola, et al., "Path Switch during HeNB-HeNB X2 HO," 3GPP TSG RAN WG3 #70 Meeting, R3-103215, Jacksonville (FL), USA, Nov. 15-19, 2010; 7 pages.
Samsung, "Open issues discussion for HeNB to HeNB Mobility," 3GPP TSG-RAN WG3#70 Meeting, R3-103420, Jacksonville (FL), USA, Nov. 15-19, 2010; 3 pages.

\* cited by examiner

CALL PRESERVATION ON HANDOVER

FIELD OF THE DISCLOSURE

This application relates to the field of mobile communications, and more particularly to a system and method for call preservation on handover conditions between two or more nodes.

BACKGROUND

General Packet Radio Services (GPRS) is a second-generation (2G) packet-based wireless communication and data service for mobile phones, tablets, mobile computers, and other mobile devices operable, in certain embodiments, to provide improved data rates over first-generation technologies and continuous connection to the Internet. GPRS is based on the Global System for Mobile (GSM) communication and complements existing services. At least one GPRS Specification defines a GPRS tunneling protocol (GTP) method, in which tunneling may be established between certain user plane nodes.

GPRS packet-based services are provided to end users on a shared-use basis as packets are needed, rather than certain earlier systems, such as cell-based services that in some cases supported only one user at a time GPRS network topologies later evolved toward Enhanced Data Rates for Global Evolution (EDGE) and Universal Mobile Telecommunications Service (UMTS) network topologies, representing third-generation (3G) technologies.

Long-Term Evolution (LTE) is a fourth-generation (4G) or third-generation+(3G+) wireless technology providing increased speeds and increased reliability.

BRIEF DESCRIPTION OF THE DRAWINGS

The present disclosure is best understood from the following detailed description when read with the accompanying FIGURES. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
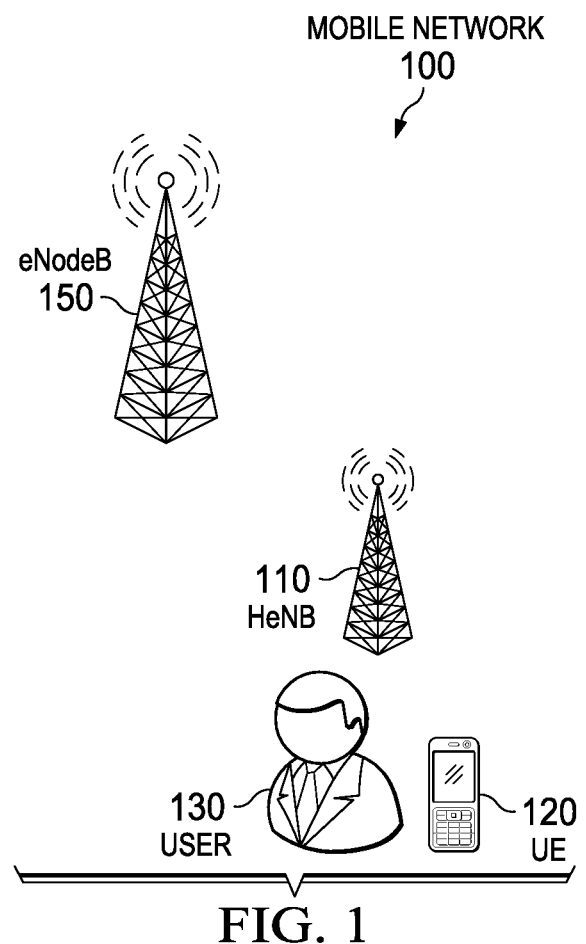
FIG. 1 is a network diagram of a wireless network according to one or more examples of the present Specification.

There is disclosed in a first example a base station comprising: a first network interface operable to connect the base station to a first network; a second network interface operable to connect the base station to a second network; and a connection engine operable to determine that a mobile device on the first network has an attenuated signal; and handover the mobile device to a second base station via the second network, comprising determining that the second base station is connected to a second gateway different from a first gateway connected to the base station, and providing an identifier of the second gateway in a handover request.

There is disclosed in a second example one or more computer-readable mediums having stored thereon executable instructions operable to instruct a processor to determine that a mobile device on a first network has an attenuated signal to a first base station; and handover the mobile device to a second base station via a second network, comprising determining that the first base station is connected to a first gateway different from a second gateway connected to a second base station, and providing an identifier of a tunnel endpoint to the second gateway in a handover request.

There is disclosed in a third example a mobile communication network device comprising a network interface operable to communicatively couple the device to a network; and a connection engine operable to receive on the network a request to modify a bearer from a source base station to a target base station; and send to the network a response identifying a gateway connected to the target base station.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiment many have different advantages, and no particular advantage is necessarily required of any embodiment.

Certain embodiments according to this Specification are directed towards identifying and addressing limitations in some wireless networks, including some 3G, 3G+, 4G, and better networks. LTE is used herein as an example for purposes of discussion and illustration, though a practitioner in the art will appreciate that the teachings of this Specification may be applied equally well to other network topologies.

There is disclosed according to one or more examples of this Specification an LTE handover (HO) scenario in which at least one of the source or the target node is a home evolved node B (HeNB) connected to an HeNB gateway (HeNBGW). In that case, HO on an X2 channel may not be successful. For example, where the source node is an eNodeB connected to a serving gateway (SGW), when it sends an X2 HO request to a target HeNB, it will provide the address of the SGW as the correct gateway with which to establish a tunnel. However, the target HeNB may be connected instead to a HeNBGW, which in turn is connected to the SGW. Thus, the HeNB's attempt to establish a tunnel directly with the SGW will fail.

To address this, an example method according to one or more embodiments of the present Specification may include the following:

1. Source eNodeB passes the uplink tunnel endpoint (UL TE) (pointing to the SGW) to the target (HeNB).
2. Upon receiving this UL TE (pointing to SGW), the target HeNB passes this value in S1AP Path Switch message to HeNBGW.
3. When HeNBGW receives this S1AP: Path Switch Request message with UL TE (pointing to the SGW), it establishes the GTP tunnel to it.
4. At the same time, the HeNBGW returns S1AP Path Switch Acknowledge message back to HeNB, indicating the UL TE pointing to itself (i.e. HeNBGW).
5. When the HeNB receives this message from HeNBGW, it establishes the UL TE (i.e. with HeNBGW).

Thus, the correct tunnels are established and the HO request is successful without dropped calls or packets.

Additional embodiments are disclosed herein by way of example, such as embodiments wherein a source HeNB hands over to a target eNodeB, and where a source HeNB hands over to a target HeNB. All of these are provided by way of non-limiting example only, and it will be understood that the principles and methods disclosed herein are applicable to other appropriate embodiments.

FIG. 1 is a network level diagram of a mobile communication network 100 according to one or more examples of the present Specification. In an example, mobile network 100 may be a long-term evolution (LTE) network or other similar 3G+, 4G, or advanced mobile communication network. LTE is used throughout this Specification as a commonly-used standard as of the date of this application, though it should be understood that the appended claims are not intended to be limited to a specific wireless implementation such as LTE. Rather, the teachings and disclosures of this Specification may be applicable to many types of communication networks.

Mobile network 100 may include one or more base stations, which in LTE terminology are referred to as eNodeB 150-1 and eNodeB 150-2. In other communication standards, other terms or identifiers may be used to refer to a base station or an equivalent structure, and it is intended that the terms "eNodeB," "home eNodeB," "base station," "macro cell," "small cell," "femto cell," and other similar terms be understood to include any and all equivalent structures in a particular network architecture, unless expressly stated otherwise. As a class, for ease of reference, HeNB 110 and eNodeB 150-2 may both be referred to as "base stations."

eNodeBs 150 may represent large wireless transmitter/receivers which may be provided, for example, by a mobile telecommunications company to enable one or more users 130 to communicate with mobile network 100 via user equipment 120, which may be a form of user equipment. In various embodiments, UE 120 may be or include a computer, embedded computer, embedded controller, embedded sensor, personal digital assistant (PDA), laptop computer, cellular telephone, IP telephone, smart phone, tablet computer, convertible tablet computer, handheld calculator, or any other electronic, microelectronic, or microelectromechanical device for processing and communicating data.

User 130 may be stationed proximate to a HeNB 110, which is a smaller scale embodiment of an eNodeB 150. The architecture for eNodeBs, HeNBs, and other LTE network elements are described in more detail in the various specifications published by the 3rd Generation Partnership Project (3GPP), such as those found at http://www.3gpp.org/specifications as of the date of this Specification.

In an example, HeNB 110 may be communicatively coupled to eNodeB 150-1, and may act as a wireless signal booster or other similar device. Thus, while user equipment (UE) 120 is within range of HeNB 110, UE 120 communicates with eNodeB 150 via HeNB 110. However, as user 130 proceeds along a path, such as while driving, user equipment 120 may pass out of range of HeNB 110. Thus, if user 130 is engaged in communication, such as using the Internet, texting, or operating a voice call over HeNB 110, smooth transition should be made from HeNB 110 to eNodeB 150.

The system and method of the present Specification describe a useful method for handling the transition from HeNB 110 which is communicatively coupled to eNodeB 150. The system and method of this Specification may also be used, for example, when handing off between two HeNBs, or when handing off from an eNodeB to a HeNB.

Figure 2:
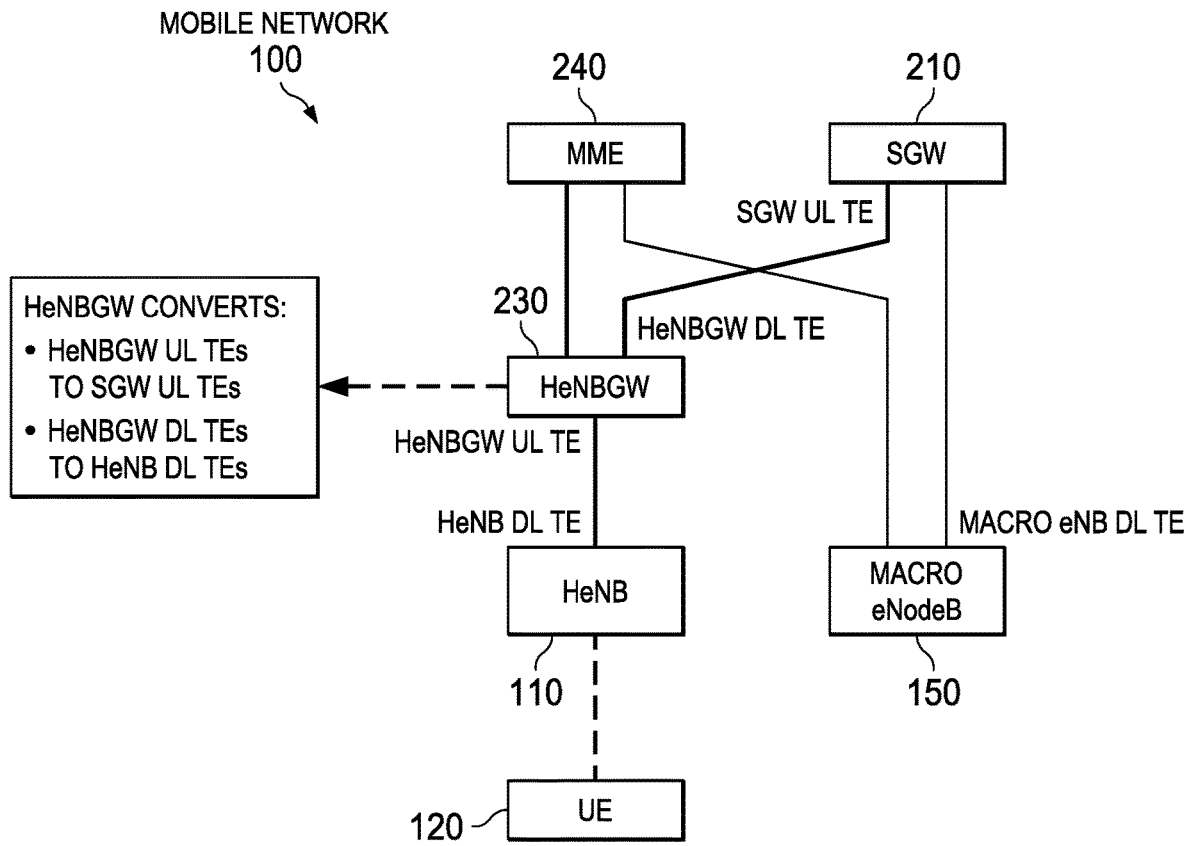
FIGS. 2-5B are network diagrams of handover between base nodes in a wireless network according to one or more examples of the present Specification.

FIG. 2 is an S1-level block diagram of selected elements of mobile network 100 according to one or more examples of the present Specification. "S1" is used in this Specification to refer to a network layer that hosts the user plane and control plane of a network topology such as LTE. 51 may be provided, in one example, over a wireless medium. A second network layer may be referred to as "X2," and may include in certain embodiments a physical network connection between two subnetworks, for example directly connecting a first HeNB to a second HeNB, or a femto HeNB to a macro eNodeB.

Also visible in mobile network 100 of FIG. 2, are user equipment 120, eNodeB 150, and HeNB 110.

As visible in FIG. 2, user equipment 120 communicatively couples to HeNB 110. HeNB 110 communicatively couples to a HeNBGW 230. HeNB Gateway 230 may be a device that is operable to communicatively couple one or more HeNBs 110 to an eNodeB 150.

HeNBGW 230 is communicatively coupled to a serving Gateway 210 and a mobility management entity 240 SGW 210 and MME 240 in turn communicatively couple to eNodeB 150.

SGW 210 in one example provides important network functions for LTE core networks, including the evolved packet core (EPC) infrastructure. SGW 210 resides in the user plane of mobile network 100.

MME 240 provides additional critical network functions for LTE communications on mobile network 100. MME 240 resides on the control plane of mobile network 100. Thus, SGW 210 may be generally considered to be a device providing user plane connectivity to eNodeB 150, while MME 240 may be thought of as a control plane a device providing control plane connectivity to eNodeB 150.

HeNBGW 230 provides important functions, including conversions of some information elements. For HeNB 110, HeNBGW 230 converts SGW uplink terminal endpoints to HeNBGW uplink terminal endpoints, and HeNB downlink terminal endpoints to HeNBGW downlink terminal endpoints. A plurality of HeNBs may be connected to a single HeNBGW, though this Specification provides examples drawn primarily to handover (HO) between two HeNBs connected to different HeNBGWs, or between a HeNB connected to a HeNBGW and an eNodeB connected directly to an SGW.

In light of the network architectures described in FIGS. 1 and 2, the following deployment scenario is particularly apt to this Specification:
1. one or more HeNBs are deployed under a HeNBGW; and
2. the HeNBGW aggregates S1U (S1 user plane traffic) to and from the HeNBs, in addition to S1C (S1 control plane traffic).

In that case, certain handover scenarios are either unsupported or not optimally supported under some known architectures, including for example a known radio access networks working group 3 (RAN3) Specification. These include, by way of non-limiting example:
1. HeNB to HeNB X2 HO, where the source and target HeNBs are under different HeNBGWs
2. HeNB to macro eNodeB X2 HO
3. Macro eNodeB to HeNB X2 HO In these mobility scenarios, X2 HO may fail under certain known architectures as the bearer path update from the source-side HeNBGW cannot be transferred over to the target side correctly (either another HeNBGW or a macro eNB). Specifically, in an example X2AP: HANDOVER REQUEST message, a source base station (the base stations currently handling the connection) may provide to a target base station (the base station that is to pick up the connection) a tunnel endpoint identifier (TEID) for its current gateway. This works seamlessly so long as both base stations are connected to the gateway, so that the target gateway can successfully establish a tunnel endpoint (TE) to the gateway. But an error occurs in the scenarios listed above when a base station tries to establish a TE to a gateway to which it is not connected, such as a HeNB trying to establish a TE directly to a SGW, or an eNodeB trying to establish a TE to a HeNBGW.

For example, to set up one or more "E-UTRAN radio access bearer" (E-RAB) channels, a source base station may send to a target base station an "E-RABs to be Setup List." This may include a "UL GTP Tunnel Endpoint" information element (IE) (Transport Layer Address and GTP TEID IEs). These IEs contain the value of the endpoint of the source HeNBGW and not the actual SGW in case the HeNBGW aggregates the S1U of multiple HeNBs toward SGW. So if the target is under a different HeNBGW or macro eNB, these TLA and GTP TEID values remain the source HeNBGW, hence the bearer path is stuck at the source HeNBGW. However, this GTP tunnel endpoint at the source HeNB-GW is bound to be deleted after the HO is completed, leaving the UL path no longer valid from the target HeNB/eNB's perspective.

There is, however, sufficient information within the architecture to provide correct tunneling information so that the target base station can successfully establish a TE. Thus, where a system and method are configured to provide a proper endpoint during HO, continuity may be maintained, for example according to a two-part solution as follows.

First, in the X2AP HANDOVER REQUEST message, the necessary IE is already present and defined (UL GTP Tunnel Endpoint IE). The only missing piece is the actual values conveyed in it and how the source HeNB obtains these values. In the specific X2 HO scenarios described herein, the source base station must provide to the target base station the GTP tunnel endpoint at the SGW (not at the HeNBGW) in the case of a handover from a HeNB to an eNodeB. But certain earlier S1AP specifications provide only one set of values, namely the GTP tunnel endpoint at the HeNBGW in the case of S1-U aggregation at the HeNBGW. This requires the 2nd set of GTP tunnel endpoint to be conveyed each time E-RAB is setup (S1AP: E-RAB Setup procedure and Initial Context Setup procedure).

Second, upon completing the X2AP Handover Preparation procedure (HANDOVER REQUEST and HANDOVER REQUEST ACKNOWLEDGE messages), the target HeNB/eNB sends the S1AP: PATH SWITCH REQUEST message to the HeNBGW/MME. In this message, the target HeNB/eNodeB passes the GTP tunnel endpoint values that were originally provided by the source HeNB in X2AP HANDOVER REQUEST message as discussed above. In the case of a HeNBGW, for example, the HeNBGW uses these values to establish the UL GTP tunnel with the indicated SGW.

In an example, for X2 link setup between Macro eNodeB and HeNB, HeNB needs to support:
1. HeNB SHALL be able to distinguish if its neighbor is a Macro eNodeB or a HeNB
2. HeNB SHALL send its IPSec end-point IP Address in:
   i. <eNodeB Config Transfer: SON Config Transfer: X2 TNL Config Info: eNB X2 Extended Transport Layer Address: IPSec Transport Layer Addresses>
3. HeNB SHALL set up the X2 connection with the Macro using the IP Address information received in:
   i. <MME Config Transfer: SON Config Transfer: X2 TNL Config Info: eNB X2 Extended Transport Layer Address: IPSec Transport Layer Addresses>

In an example, for X2 link setup between Macro eNodeB and HeNB, macro eNodeB needs to support:
1. Macro eNodeB SHALL be able to distinguish if its neighbor is a Macro eNodeB or a HeNB
2. Macro eNodeB SHALL send its IP Address in:
   i. <eNodeB Config Transfer: SON Config Transfer: X2 TNL Config Info: eNB X2 Extended Transport Layer Address: IPSec Transport Layer Addresses>
3. Macro eNodeB SHALL set up the X2 connection with the HeNB using the IP Address information received in:
   i. <MME Config Transfer: SON Config Transfer: X2 TNL Config Info: eNB X2 Extended Transport Layer Address: IPSec Transport Layer Addresses>

In an example, for X2 handovers with HeNB:
1. Macro eNodeB shall support the 3GPP standard X2 messaging for X2 handovers
2. Macro eNodeB shall be able to disambiguate the PCI to the appropriate ECGI and X2 link
3. During Handover, GTP Tunnel Endpoint Information of E-RABs is transferred from Source Node to Target Node
4. GTP Tunnel Endpoint Information includes GTP Tunnel Endpoint Id and Transport Layer IP Address
5. Downlink GTP Tunnel Endpoint Information is the TE Info of the Source/Target Node, i.e. the HeNB or Macro eNodeB FIGS. 3A-5B provide illustrative examples of HO scenarios, showing the result of an improper HO, such as may occur in certain known systems, and the result of a proper HO as described in one or more embodiments of this Specification.

Figure 3A:
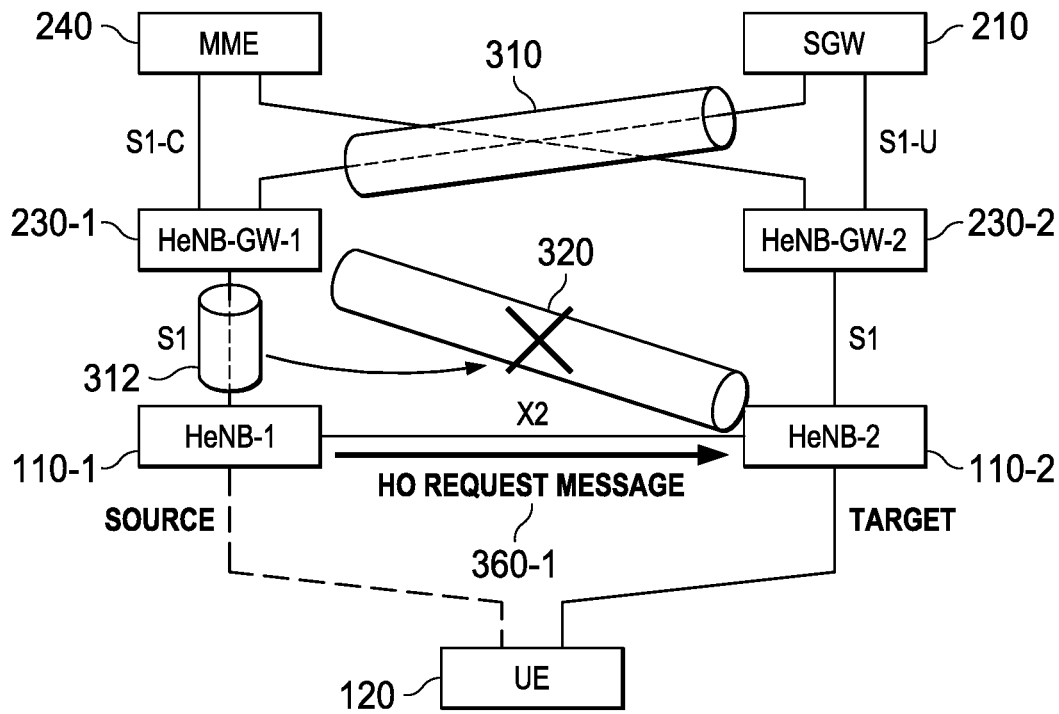
Figure 3B:
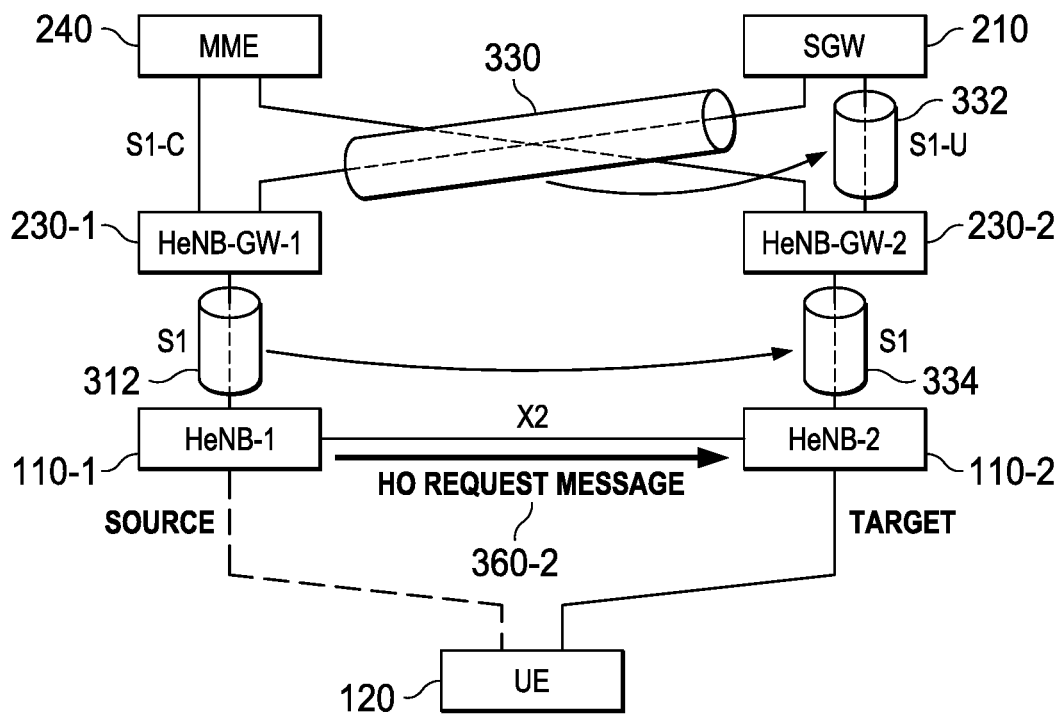

FIGS. 3A and 3B are block diagrams disclosing a handover between two HeNBs 110 according to one or more examples of the present Specification. In this example, HeNB 110-1 is connected to HeNBGW 230-1 via virtual tunnel 312. HeNBGW 230-1 is coupled to SGW 210 via virtual tunnel 310. HeNBGW 230-1 is also directly communicatively coupled to MME 240. SGW 210 is directly communicatively coupled to HeNBGW 230-2. HeNBGW 230-2 is directly communicatively coupled to MME 240 and to HeNB 110-2.

UE 120 is initially communicatively coupled to HeNB 110-1, but moves out of range over to HeNB 110-2. When HeNB 110-1 notices that the signal from the UE 120 has begun to weaken, HeNB 110-1 may send a handover request message 360 to HeNB 110-2. In some embodiments, handover request message 360 may be sent via the X2 communication protocol. X2 may be provided in a wired interface between HeNB 110-1 and HeNB 110-2.

However, under certain known specifications, when HeNB 110-1 provides handover request message 360 to HeNB 110-2, HeNB 110-1 may provide information to replicate virtual tunnel 312. Because HeNB 110-2 is not communicatively coupled to HeNBGW 230-1, it will fail to establish virtual tunnel 320, because it will not be able to replicate virtual tunnel 312. Thus, service will be interrupted until HeNB 110-2 can establish its own tunnel to HeNBGW 230-2. This may represent a dropped call or dropped packets, depending on the context.

FIG. 3B discloses desired behavior of mobile network 100 according to one or more examples of the present Specification. UE 120 is initially communicatively coupled to HeNB 110-1, but moves out of range over to HeNB 110-2. When HeNB 110-1 notices that the signal from the UAE 120 has begun to weaken, HeNB 110-1 may send a handover request message 360 to HeNB 110-2. In some embodiments, handover request message 360 may be sent via X2, which may be provided in a wired interface between HeNB 110-1 and HeNB 110-2

In the case of FIG. 3B, handover request message 360-2 is modified according to the methods of this Specification. In this case, handover request message 360-2 will instruct HeNB 110-2 to attempt to establish a TE to SGW 210. Thus, HeNB 110-2 will correctly establish tunnel 334 to HeNBGW 230-2, and virtual tunnel 332 two SGW 210. This represents the desired behavior.

Figure 4A:
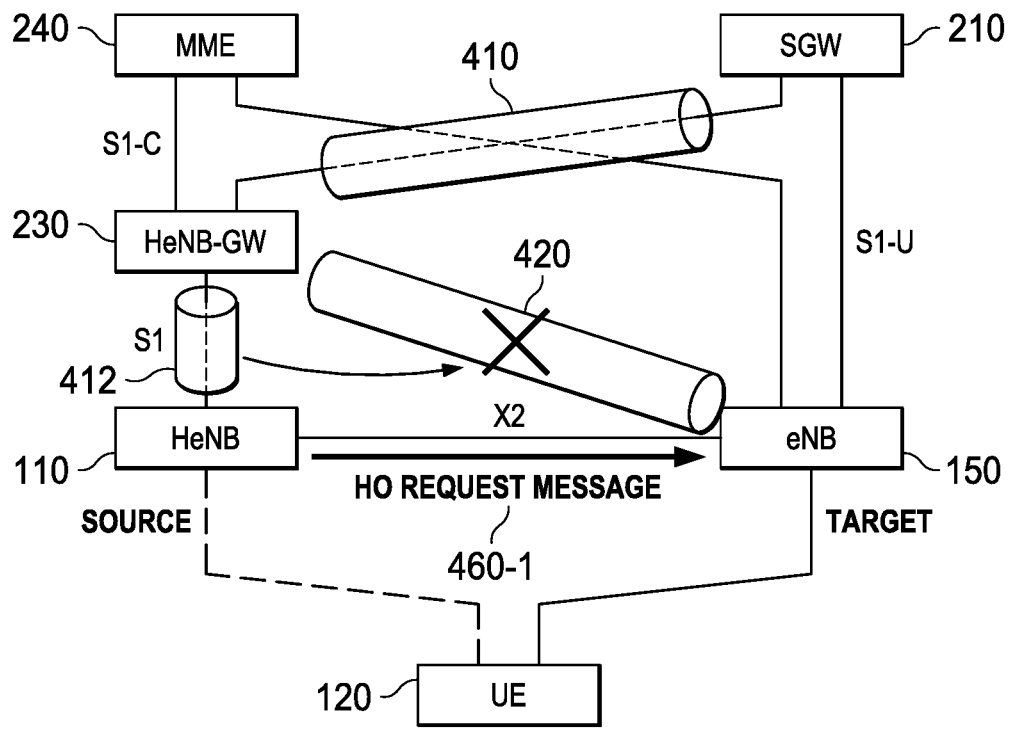
Figure 4B:
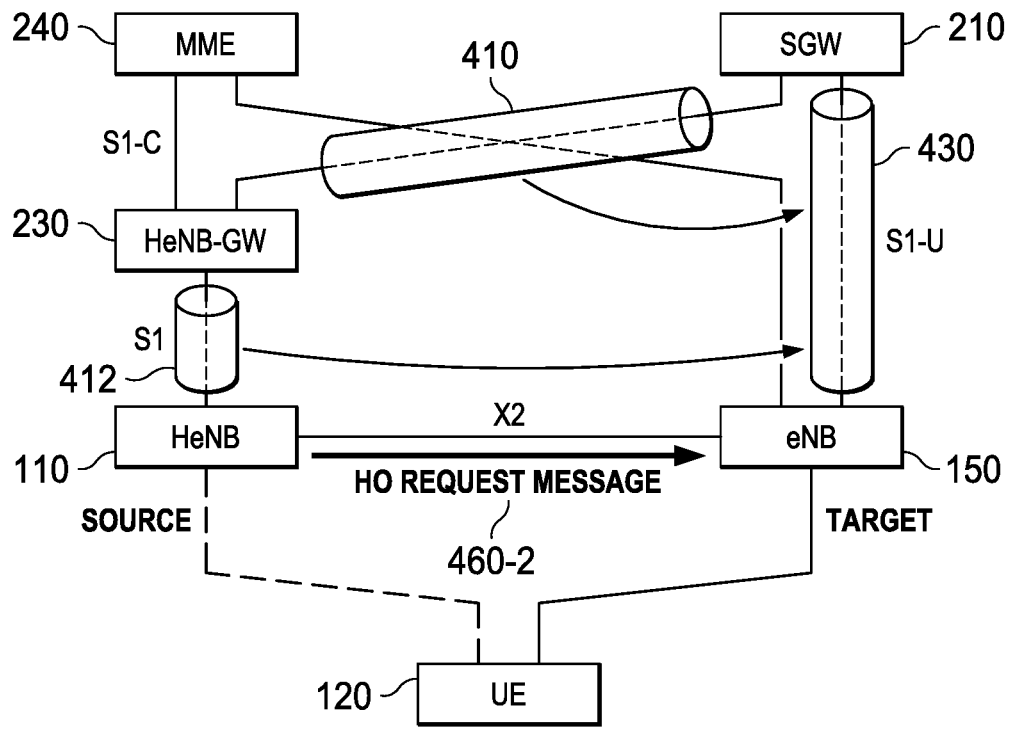

FIGS. 4A and 4B are a block diagram of a handover from a HeNB 110 to an eNodeB 150 according to one or more examples of the present Specification.

In FIG. 4A, HeNB 110 is communicatively coupled to HeNBGW 230 via virtual tunnel 412. HeNBGW 230 is directly communicatively coupled to MME 240. HeNB Gateway 230 is communicatively coupled to SGW 210 via virtual tunnel 410. MME 240 and SGW 210 are both directly communicatively coupled to eNodeB 150.

In this example, UE 120 is initially communicatively coupled to HeNB 110. However, when HeNB 110 detects that its signal strength to UE 120 has substantially weakened, it provides handover request message 460-1 to eNodeB 150. Handover request message 460-1 includes data to attempt to replicate virtual tunnel 412. However, when eNodeB 150 attempts to replicate virtual tunnel 412 in virtual tunnel 420, the attempt fails. This is because eNodeB 150 is not communicatively coupled to HeNBGW 230, and thus cannot establish the TE.

FIG. 4B discloses desired behavior of mobile network 100 according to one or more examples of the present Specification. HeNB 110 is communicatively coupled to HeNBGW 230 via virtual tunnel 412. HeNBGW 230 is directly communicatively coupled to MME 240. HeNB Gateway 230 is communicatively coupled to SGW 210 via virtual tunnel 410. MME 240 and SGW 210 are both directly communicatively coupled to eNodeB 150.

In this example, when HeNB 110 sends handover request message 460-2 to eNodeB 150, rather than attempting to establish virtual tunnel 420 in FIG. 4A, eNodeB 150 correctly establishes virtual tunnel 430 to SGW 210. This represents the desired behavior.

Figure 5A:
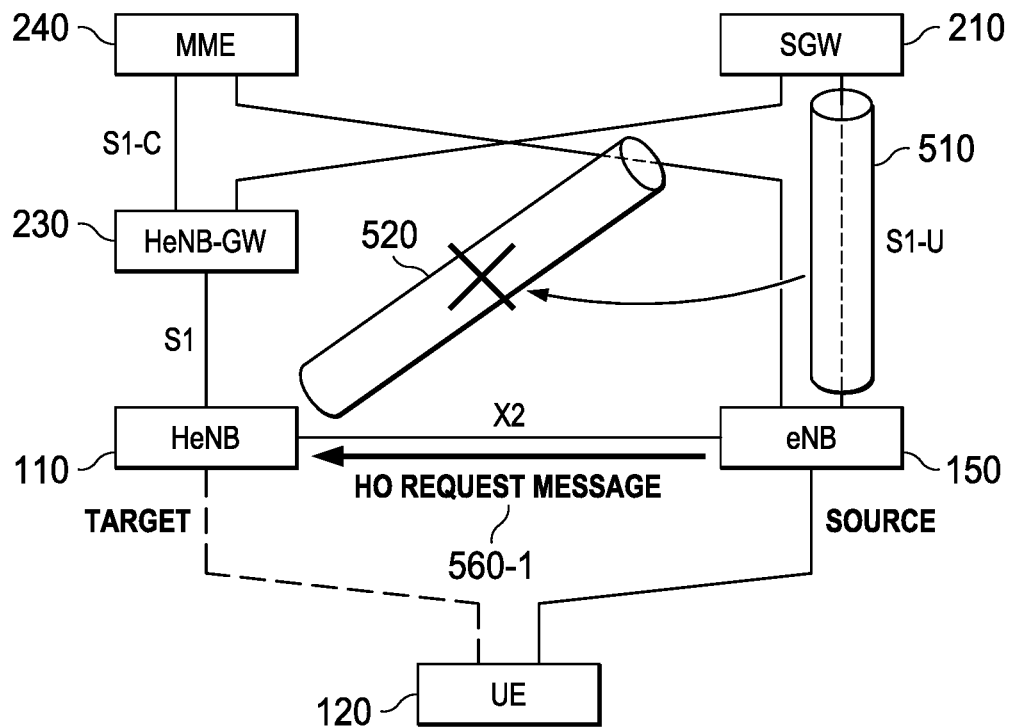
Figure 5B:
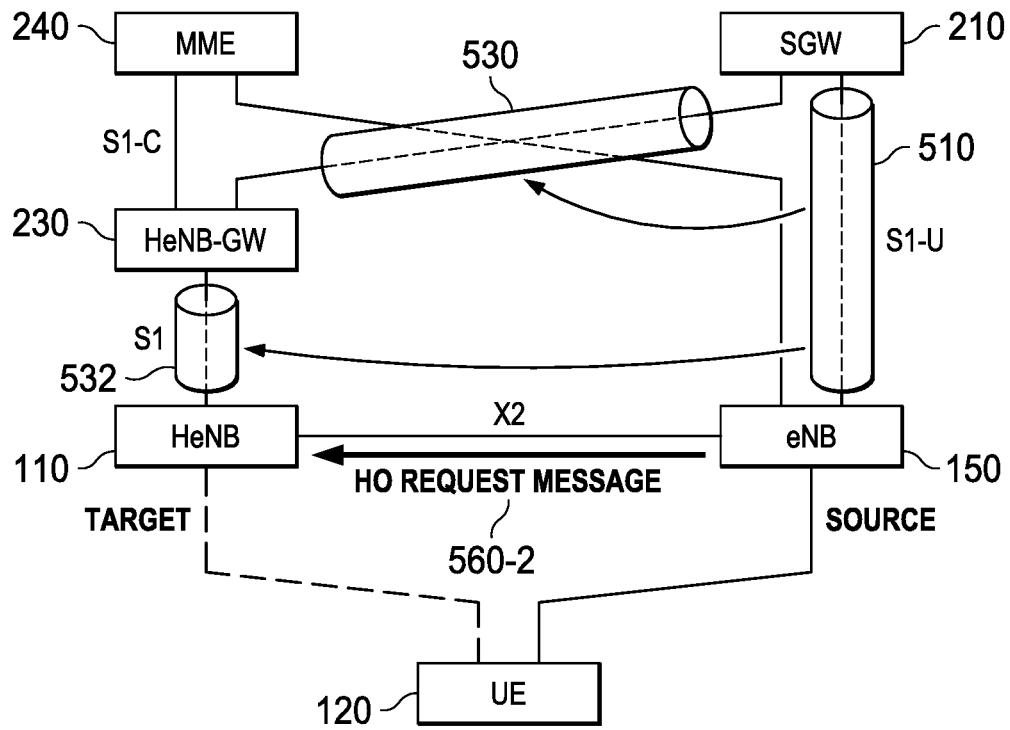

FIGS. 5A and 5B are block diagrams of a handover from an eNodeB 150 to a HeNB 110 according to one or more examples of the present Specification.

In FIG. 5A, eNodeB 150 is communicatively coupled to SGW 210 via virtual tunnel 510. eNodeB 150 is also directly communicatively coupled to MME 240. SGW 210 and an MME 240 are both communicatively coupled to eNodeB HeNBGW 230. HeNBGW 230 is communicatively coupled to HeNB 110.

UE 120 is initially communicatively coupled to eNodeB 150. However, when eNodeB 150 determines that its connection to UE 120 has substantially weakened, eNodeB 150 may send a handover request message 560-1 to HeNB 110. Handover request message 560-1 may contain information to replicate virtual tunnel 510. However, when HeNB 110 attempts to replicate virtual tunnel 510 via virtual tunnel 520, the connection will fail, as HeNB 110 is not communicatively coupled to SGW 210.

FIG. 5B discloses desired behavior of mobile network 100 according to one or more examples of the present Specification. In FIG. 5B, eNodeB 150 is communicatively coupled to SGW 210 via virtual tunnel 510. eNodeB 150 is also directly communicatively coupled to MME 240. SGW 210 and an MME 240 are both communicatively coupled to HeNBGW 230. HeNBGW 230 is communicatively coupled to HeNB 110.

When eNodeB 150 sends handover request message 560-2 to HeNB 110, handover request message 560-2 contains information to correctly establish tunnel 532 to HeNBGW 230. This ensures that HeNB 110 correctly communicatively couples to HeNBGW 230, and thereby to SGW 210 via virtual tunnel 530. This is the desired behavior.

Figure 6:
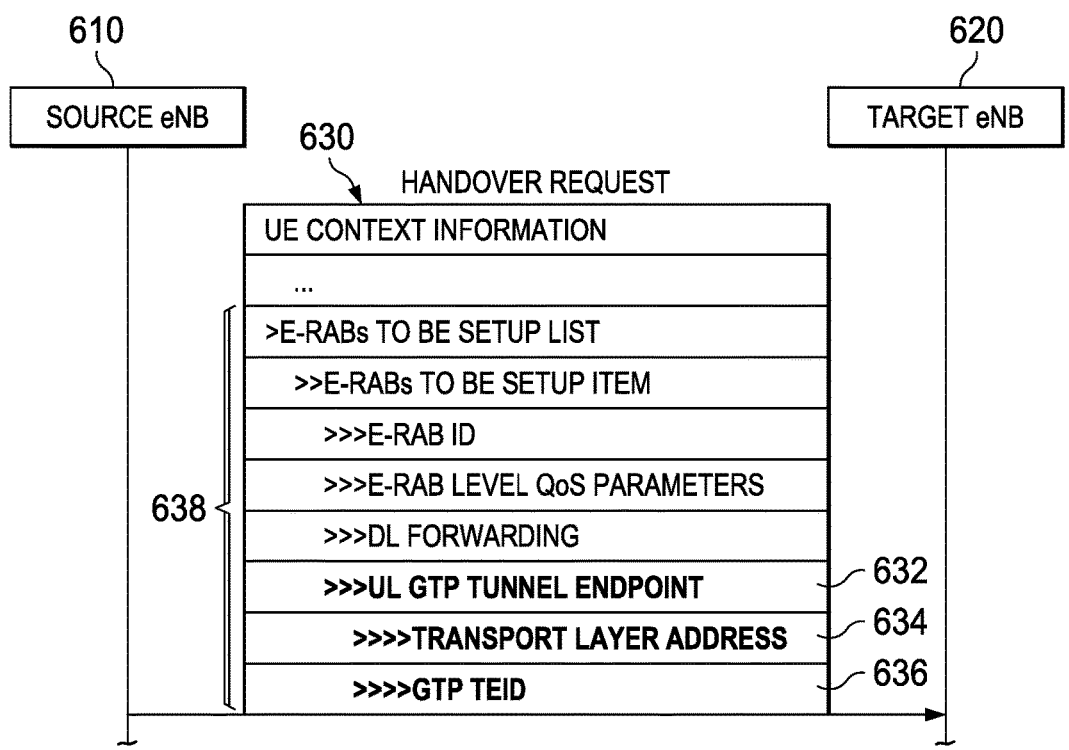
FIG. 6 is a block diagram of a data packet according to one or more examples of the present Specification.

FIG. 6 is a block diagram of a handover request 630 that may be sent from a source eNodeB 610 target eNodeB 620 in one or more examples of the present Specification. In an example, handover request 630 may contain data such as user equipment context information and an E-RABs to be Set Up List 638. Each item on list 638 may identify a particular E-RAB device to set up. Each E-RAB may include items such as an ID, quality of service (QoS) parameters, and downlink forwarding data. It may also include an UL GTP TEID (uplink GTP tunnel endpoint identifier) 632. UL GTP TEID 632 may include information such as a transport layer address 634 and a GTP TEID 636.

If these data point to a gateway connected to source eNodeB 610 and not to target eNodeB 620, then the connection may be dropped in the handover. Thus, according to the devices and methods of the present specification, UL GTP TEID 632 may be modified to point to a gateway connected to target eNodeB 620, ensuring a smooth handover.

FIGS. 7A-7E are a multipart signal flow diagram of a method 700 of handover between a source macro eNodeB 710 and a target HeNB 720 according to one or more examples of the present Specification. In this example, UE 120 is initially in communication with source macro eNodeB 710, and moves into range of target HeNB 720.

In block 730, a call is in a connected state with eNodeB 710. In block 732, UE 120 provides a measurement report to eNodeB 710. This may be in response, for example, to a measurement report request from source eNodeB 710 when source eNodeB 710 determines that its signal strength with UE 120 has fallen below a desired threshold. The measurement report may include both RF conditions to source eNodeB 710, as well as conditions to a potential handover target, such as target HeNB 720. This may lead source eNodeB 710 to determine that a handover is desirable, for example because the signal to source eNodeB 710 has weakened sufficiently, and the signal to target HeNB 720 has become sufficiently strong to justify the handover. Method 700 continues only if source eNodeB 710 determines that conditions are such that a handover is desirable.

In block 734, eNodeB 710 determines that a handover to target HeNB 720 is desirable. Thus, eNodeB 710 sends a handover request to HeNB 720. This handover request may be sent over the X2 layer, and may include, for example, one or more of the data described in FIG. 6, including SGW uplink tunnel endpoint (SGW UTE) 740. In an example, the SGW UTE field 740 designates the SGW currently in-path for source eNodeB 710. However, target HeNB 720 will not be able to connect to the in-path SGW because it connects to a HeNBGW on the S1 plane. Thus, if target HeNB 720 tries to establish a tunnel endpoint to the in-path SGW, the connection will fail.

In block 746, target HeNB 720 provides a handover request acknowledgment to source eNodeB 710. This indicates that target HeNB 720 has received the necessary information and is prepared to process the handover request.

In block 748, source eNodeB 710 sends to UE 120 a radio resource control (RRC) message called "ConnectionReconfiguration," including therein information about the target HeNB 720. This instructs UE 120 to terminate its connection to source eNodeB 710 and to connect instead to target HeNB 720.

Figure 7A:
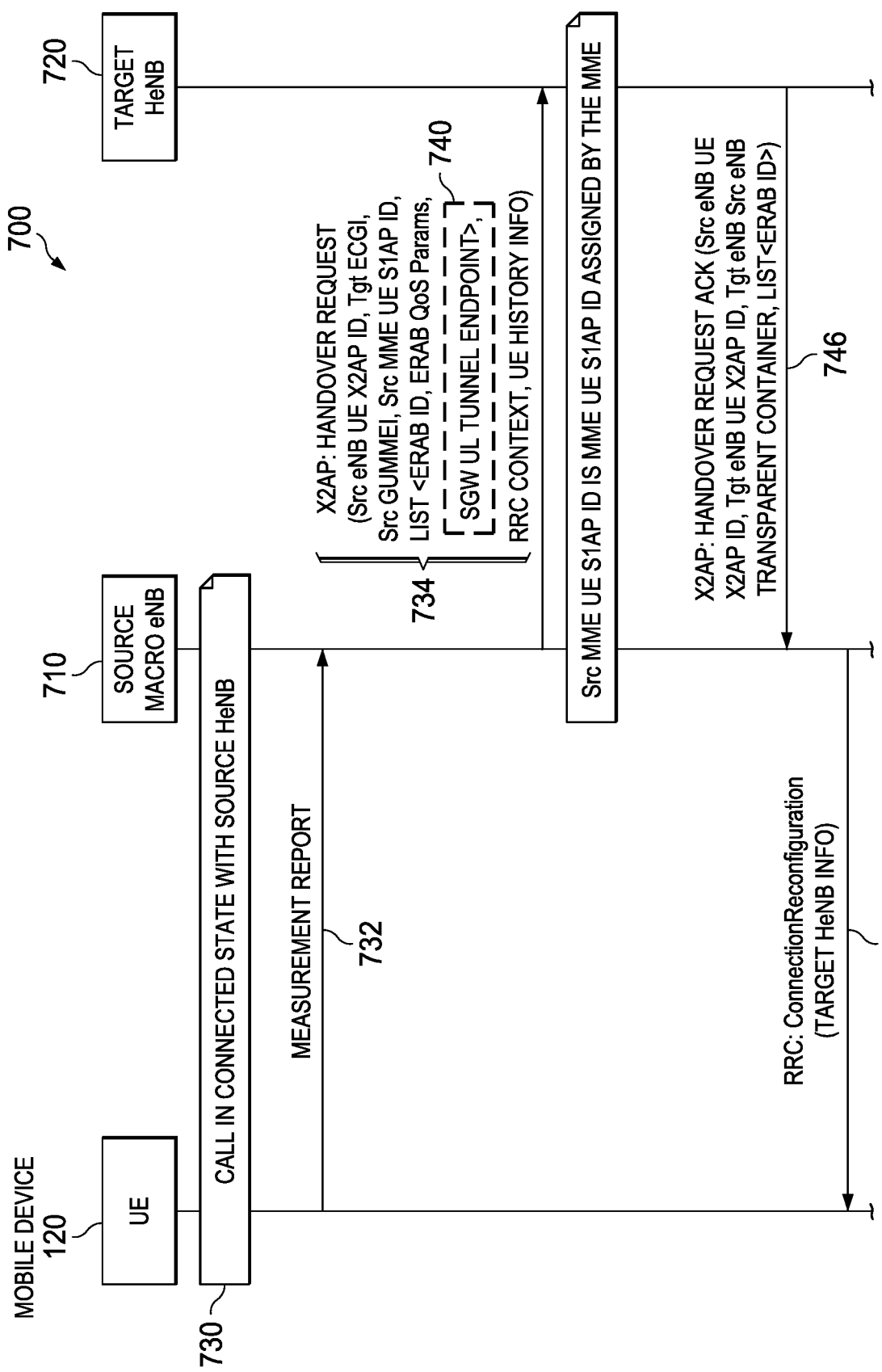
FIGS. 7A-7E are a signal flow diagram of a method according to one or more examples of the present Specification.
Figure 7B:
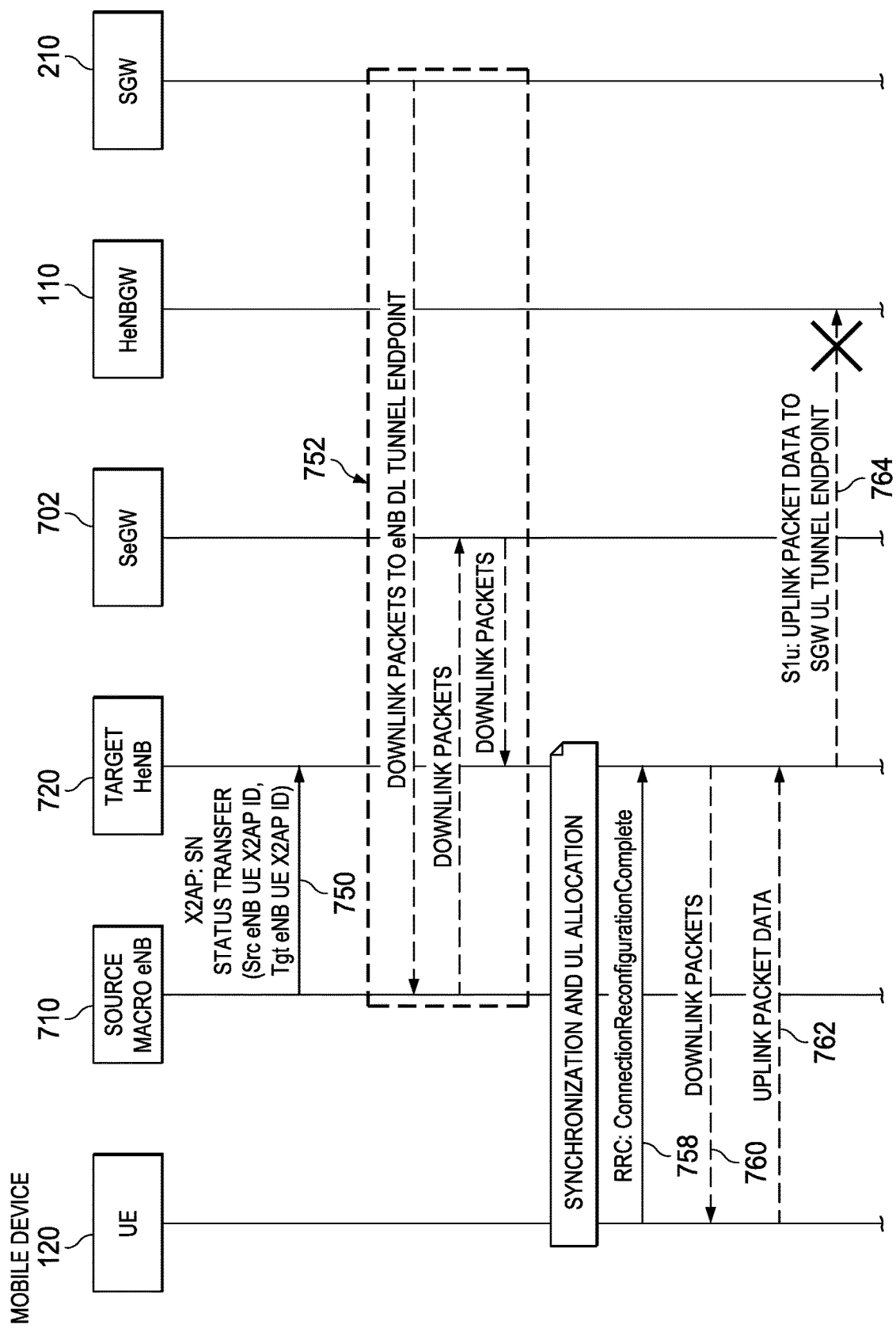

FIG. 7B is a continuation of the signal flow diagram of method 700.

In block 750, packets from the existing connection may still be arriving at source eNodeB 710, so source eNodeB 710 sends to target HeNB 720 a sequence number (SN) status transfer signal. This tells target HeNB 720 how many target packets are still accumulated in a buffer.

In block 752, SGW 210 is not yet aware that source eNodeB 710 has handed over control to target HeNB 720. Thus, SGW 210 continues to provide downlink packets to source eNodeB 710. Source eNodeB 710 forwards these packets to a security gateway (SeGW) 702, which then forwards the packets to target HeNB 720. This takes the form of direct packet forwarding via SeGW 702, if direct connection between HeNB 720 and eNodeB 710 is available.

In the meantime, synchronization and uplink allocation are occurring.

In block 758, UE 120 sends to target HeNB 720 the RRC message "ConnectionConfigurationComplete."

In block 760, target HeNB 720 begins delivering downlink packets to UE 120.

In block 762, UE 120 begins delivering its uplink packets to target HeNB 720 instead of to source eNodeB 710.

However, in block 764, if target HeNB 720 tries to establish a tunnel endpoint at HeNBGW 110, the connection will fail if handover request 734 incorrectly indicated that SGW 210 was to act as the new gateway.

Figure 7C:
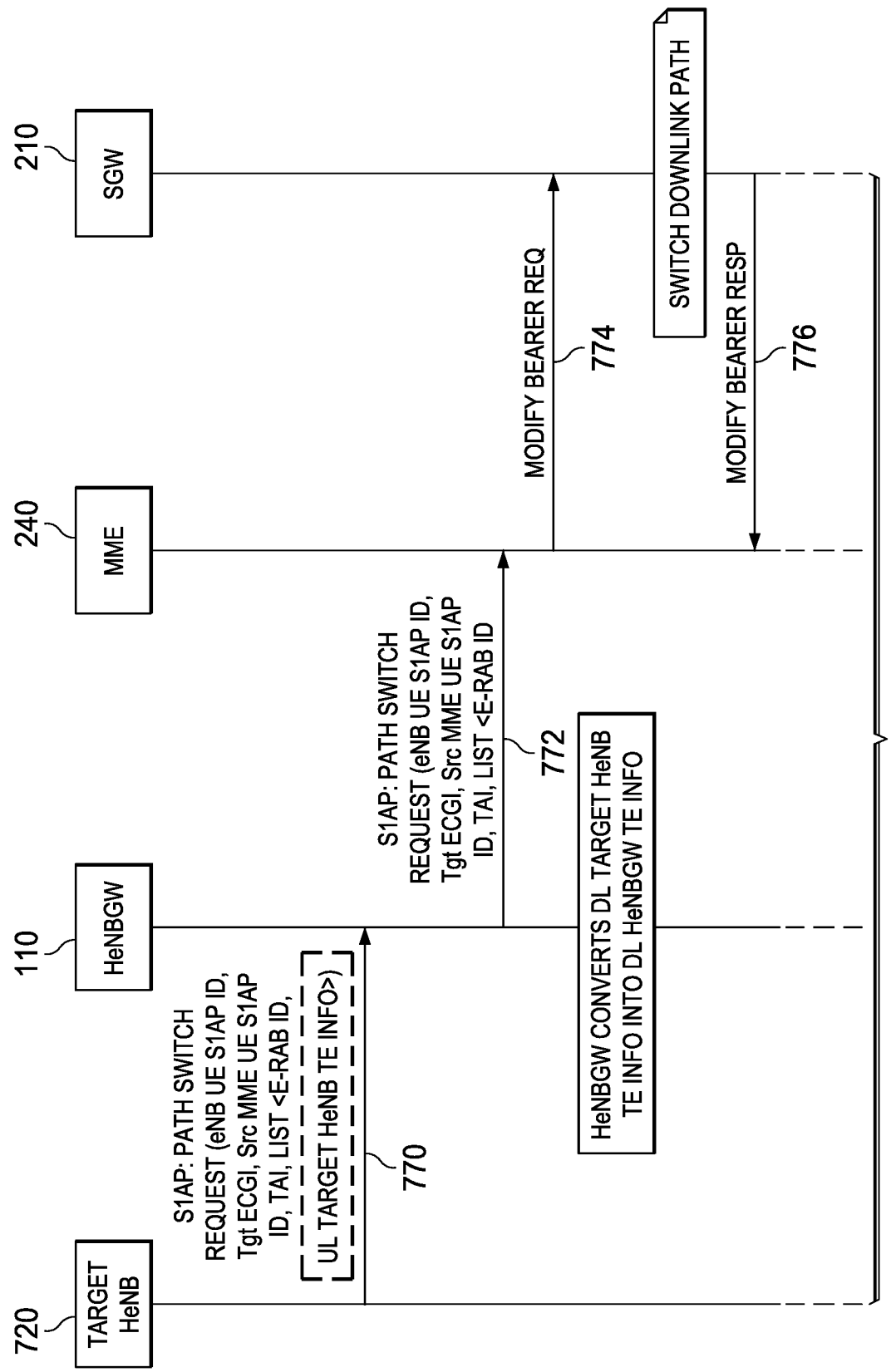

FIG. 7C is a continuation of the signal flow diagram of method 700.

Because handover occurs directly between base stations such as source eNodeB 710 and target HeNB 720 in the X2 plane, the user plane and control plane gateways and other intermediaries sitting in the S1 plane are not yet aware of the handover. Thus, in block 770, target HeNB 720 provides to HeNBGW 110 a "S1AP: Path Switch Request" message on the 51 layer. This message contains UL TE information, which may include one or more of the IEs described in this Specification. The UL TE information contains the value that was received from source eNodeB 710 in HO Request Message 734 of FIG. 7A.

In block 772, HeNBGW 110 forwards the Path Switch Request packet to MME 240 so that MME 240 is also aware of the handover. This S1AP: Path Switch request sent by HeNBGW 110 to MME 240 does not contain the UL TE IE mentioned above. In other words, HeNBGW 110 strips this IE when it forwards this Path Switch Request message to MME 240. Thus, this message is according to previously-known specifications such as 3GPP, so that in certain embodiments of the present Specification, there is no change needed in the interface between HeNBGW 110 and MME 240. In other words, the HO difficulties identified in this Specification can be solved, in certain embodiments, strictly within the interaction between HeNB 720 and HeNBGW 110.

In block 774, MME 240 sends to SGW a "Modify Bearer Request" signal, which instructs SGW 210 to modify its forwarding tables so that packets are delivered to target HeNB 720 instead of source eNodeB 710. This effectively modifies the downlink path.

In block 776, SGW 210 sends to MME 240 a "Modify Bearer Response," indicating that it acknowledges the change.

Figure 7D:
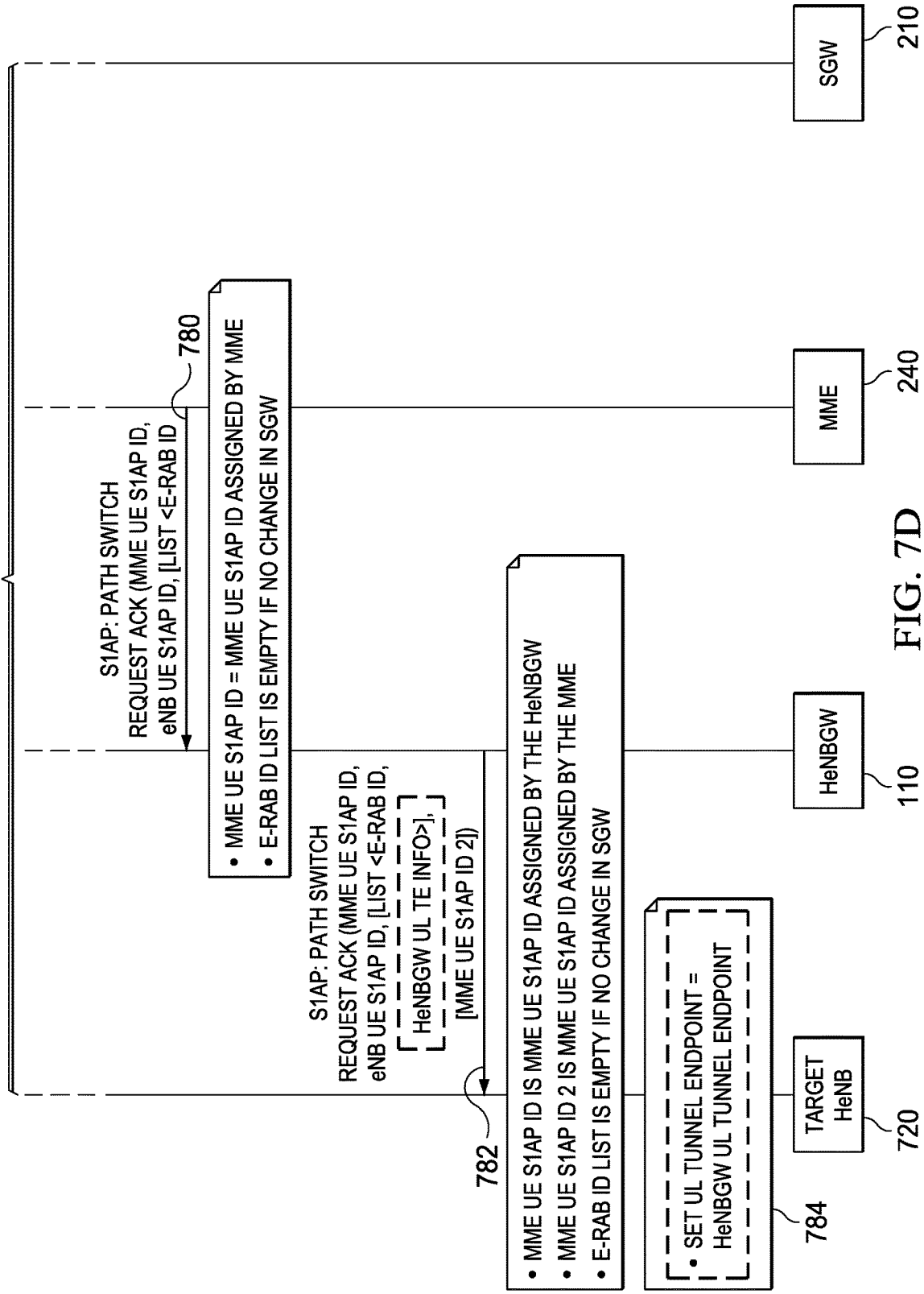

FIG. 7D is a continuation of the signal flow diagram of method 700.

In block 780, MME 240 sends to HeNBGW 110 Path Switch Request Acknowledge. In block 782, HeNBGW 110 also sends to target HeNB 720 a Path Switch Request Acknowledgement.

Figure 7E:
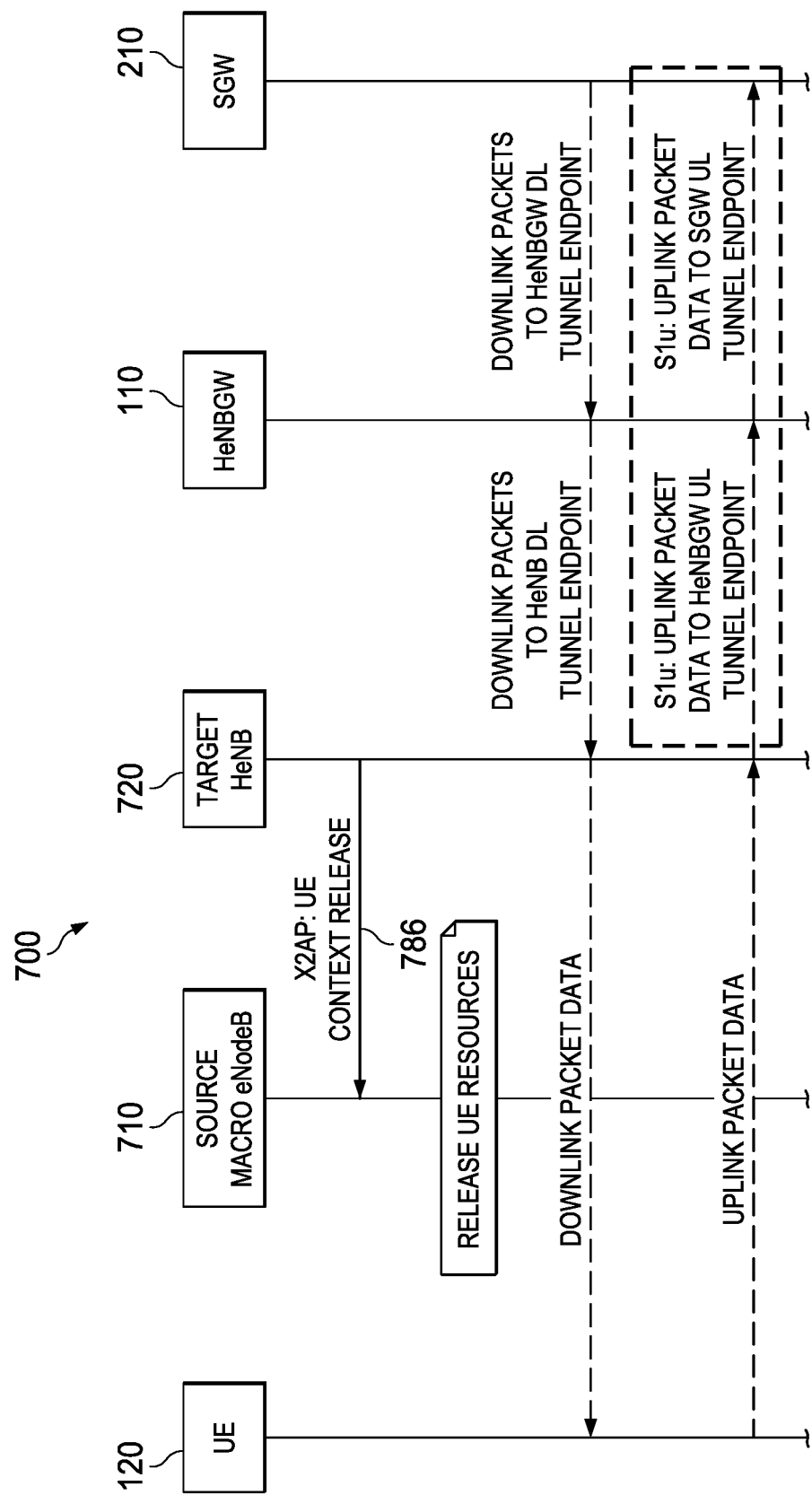

FIG. 7E is a continuation of the signal flow diagram of method 700.

Because the handover is complete, source eNodeB 710 no longer needs to maintain resources for UE 120. Thus, in block 786, target HeNB 720 sends to source eNodeB 710 a "UE Context Release" message on the X2 plane. This informs source eNodeB 710 that it is free to release resources allocated to UE 120.

The uplink packet flow is now as follows: UE 120→Target HeNB 720→HeNBGW UL TE→HeNBGW 110→SGW UL TE→SGW 210.

The downlink packet flow is now as follows: SGW 210→HeNBGW DL TE→HeNBGW 110→HeNB DL TE→Target HeNB 720→UE 120.

FIGS. 8A-8D are a multipart signal flow diagram of a method 800 of handover between a source HeNB 802 and a target eNodeB 804 according to one or more examples of the present Specification.

Figure 8A:
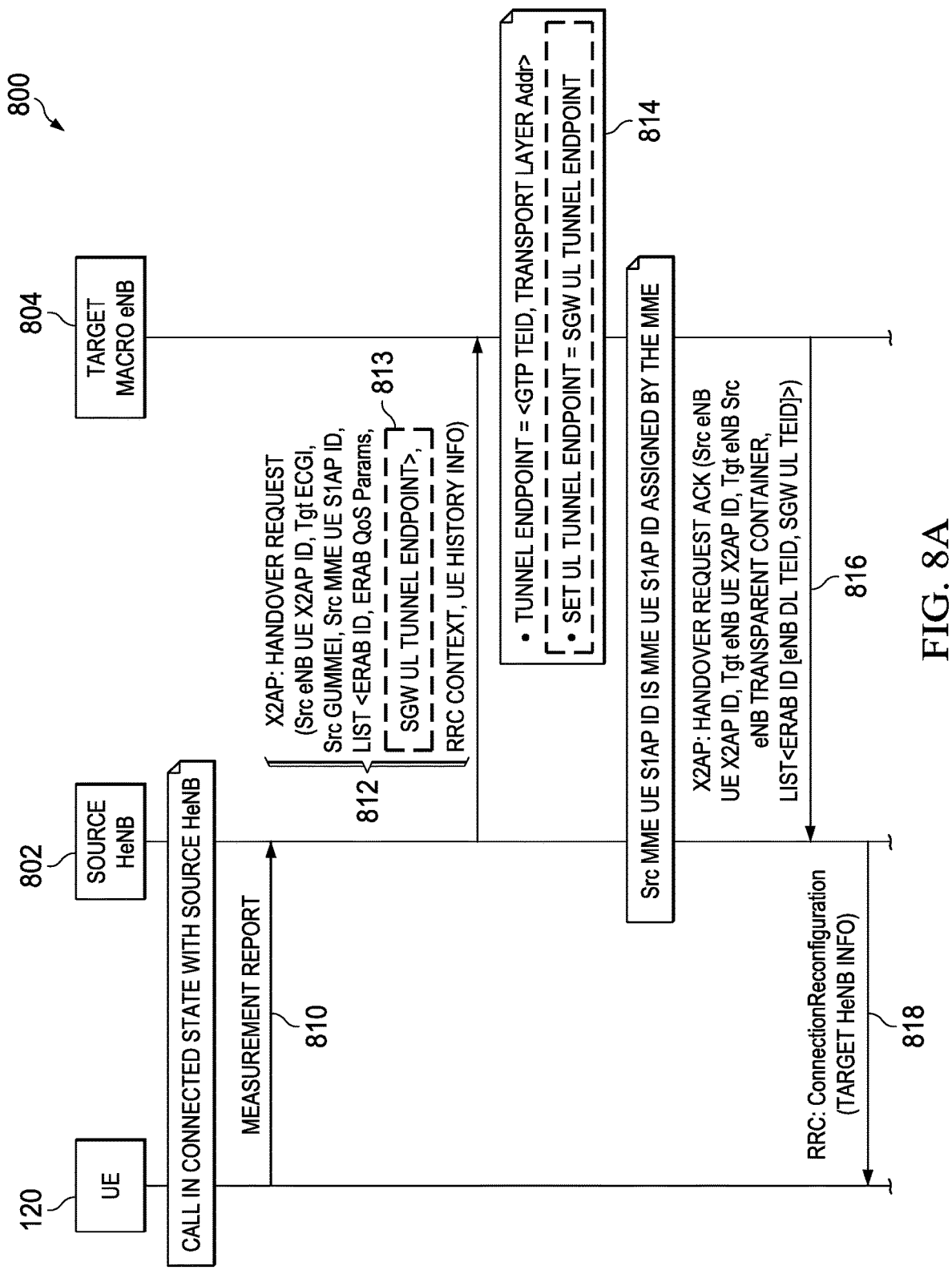
FIGS. 8A-8D are a signal flow diagram of a method according to one or more examples of the present Specification.

Beginning in FIG. 8A, UE 120 is initially in a connected state with source HeNB 802.

In block 810, a call is in a connected state with source HeNB 802, and UE 120 provides a measurement report to HeNB 802. This may be in response, for example, to a measurement report request from source HeNB 802 when source HeNB 802 determines that its signal strength with UE 120 has fallen below a desired threshold. The measurement report may include both RF conditions to source HeNB 802, as well as conditions to a potential handover target, such as target eNodeB 804. This may lead source HeNB 802 to determine that a handover is desirable, for example because the signal to source HeNB 802 has weakened sufficiently and the signal to target eNodeB 804 has become sufficiently strong to justify the handover. The method 800 continues only if source HeNB 802 determines that conditions are such that a handover is desirable.

In block 812, HeNB 802 determines that a handover to target eNodeB 804 is desirable. Thus, HeNB 802 sends a handover request to eNodeB 804. This handover request may be sent over the X2 layer, and may include, for example, one or more of the data described in FIG. 6, including HeNBGW uplink tunnel endpoint (HeNBGW UTE) 813. In an example, HeNBGW UTE field 813 designates the HeNBGW currently in-path for source HeNB 802. However, target eNodeB 804 will not be able to connect to the in-path HeNBGW because it connects to a SGW on the S1 plane. Thus, if target eNodeB 804 tries to establish a tunnel endpoint to the in-path HeNBGW, the connection will fail. To address this difficulty, in another embodiment, the HeNGBW UTE field designates not the HeNBGW currently in-path for source HeNB 802, but rather a SGW that is coupled to target eNodeB 804.

In block 816, target eNodeB 804 provides a handover request acknowledgment to source HeNB 802. This indicates that target eNodeB 804 has received the necessary information and is prepared to process the handover request.

In block 818, source HeNB 802 sends to UE 120 an RRC "ConnectionReconfiguration" message, including therein information about target eNodeB 804. This instructs UE 120 to terminate its connection to source HeNB 802 and to connect instead to target eNodeB 804.

Figure 8B:
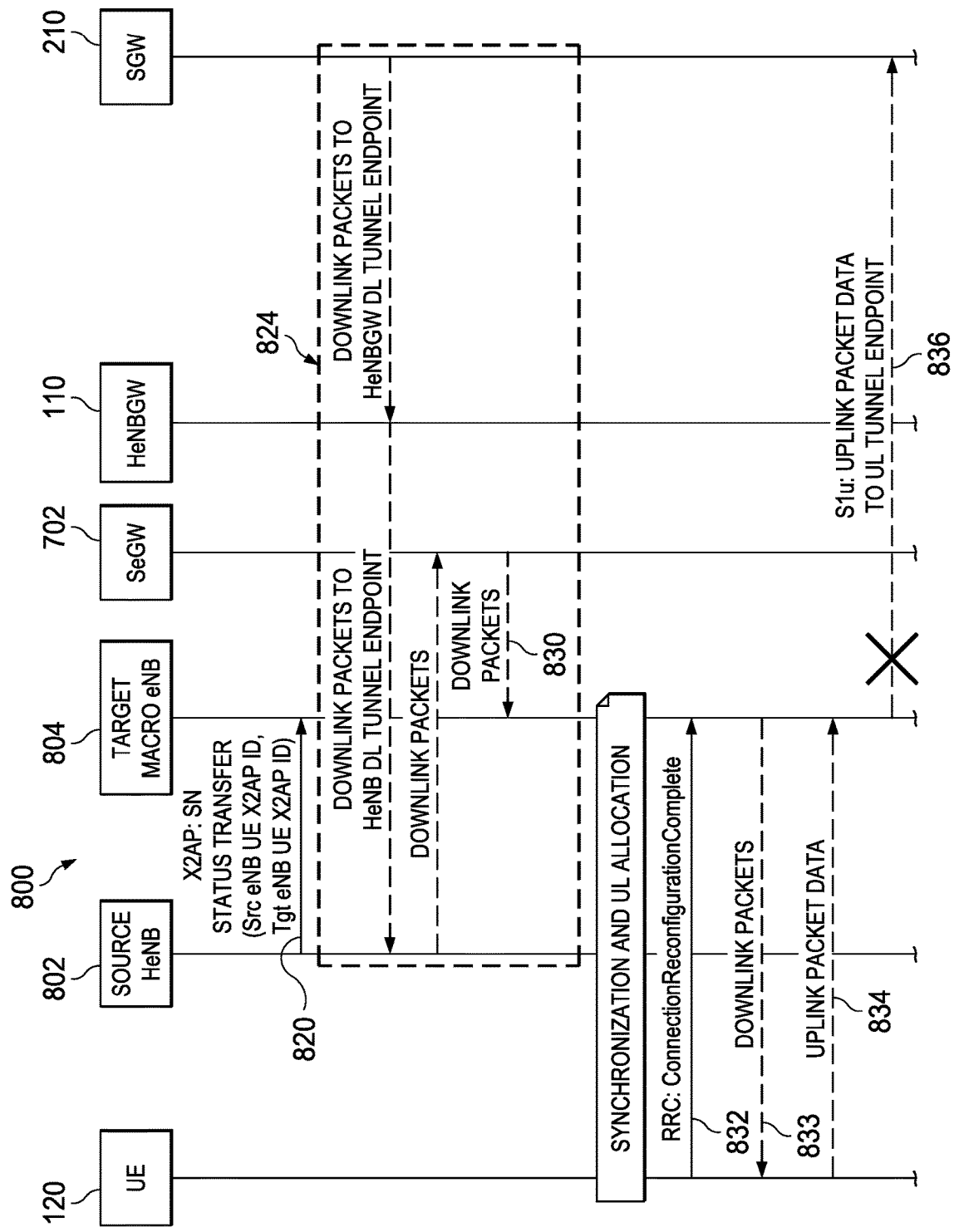

FIG. 8B is a continuation of the signal flow diagram of method 800.

In block 820, packets from the existing connection may still be arriving at source HeNB 802, so source HeNB 802 sends to target eNodeB 804 a sequence number (SN) status transfer signal. This tells target eNodeB 804 how many target packets are still accumulated in a buffer.

In block 824, SGW 210 is not yet aware that source HeNB 802 has handed over control to target eNodeB 804. Thus, SGW 210 continues to provide downlink packets to source HeNB 802. Source HeNB 802 forwards these packets to SeGW 702, which then forwards the packets to target eNodeB 804. This takes the form of direct packet forwarding via SeGW 702, if direct connection between eNodeB 804 and HeNB 802 is available.

In the meantime, synchronization and uplink allocation are occurring.

In block 832, UE 120 sends to target eNodeB 804 the RRC message "ConnectionConfigurationComplete."

In block 833, target eNodeB 804 begins delivering downlink packets to UE 120.

In block 834, UE 120 begins delivering its uplink packets to target eNodeB 804 instead of to source HeNB 802.

However, in block 836, if target eNodeB 804 tries to establish a tunnel endpoint at HeNBGW 110, the connection will fail if handover request 812 incorrectly indicated that HeNBGW 110 was to act as the new gateway.

Figure 8C:
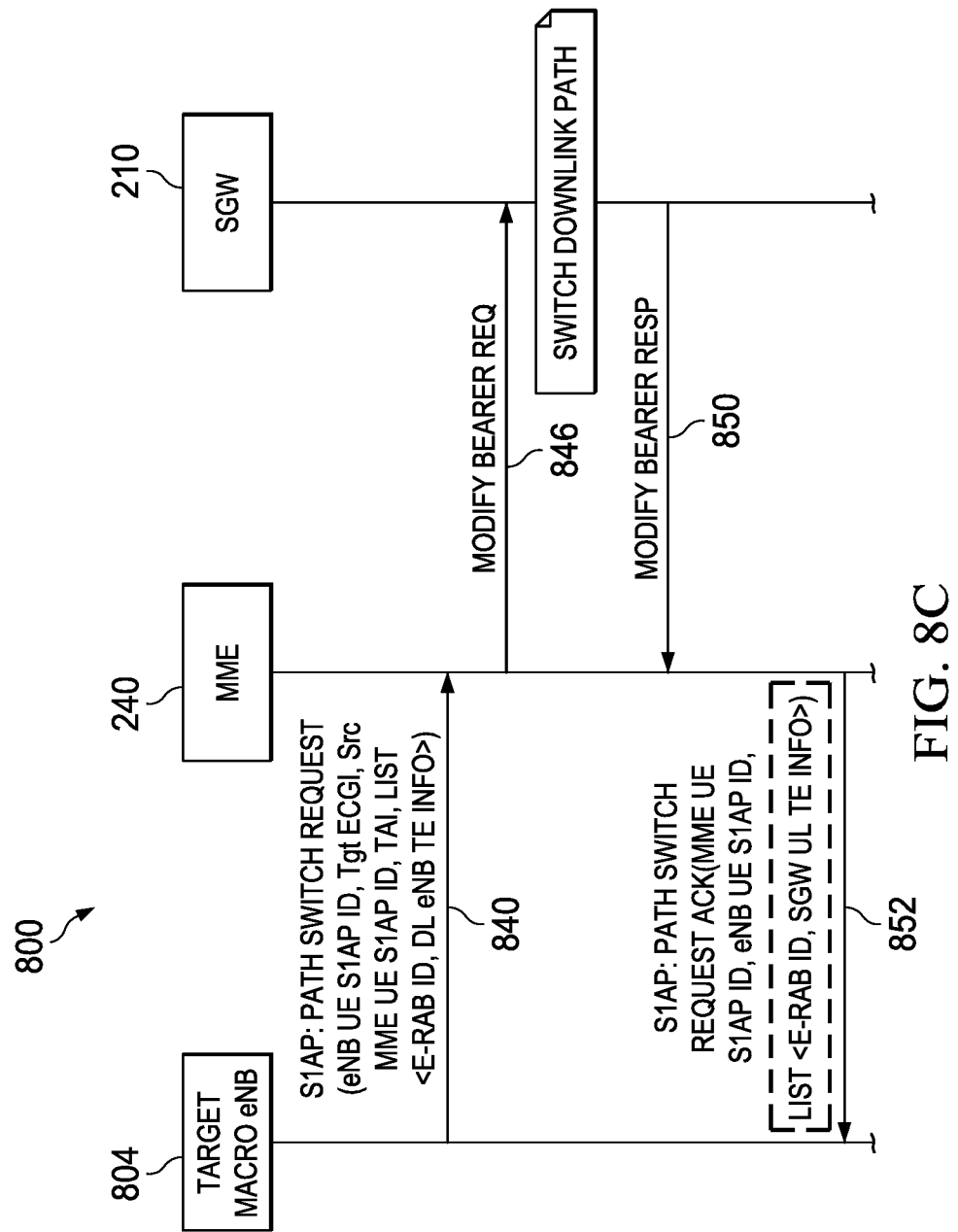

FIG. 8C is a continuation of the signal flow diagram of method 800.

Because handover occurs directly between base stations such as source HeNB 802 and target eNodeB 804 in the X2 plane, the user plane and control plane gateways and other intermediaries sitting in the S1 plane are not yet aware of the handover. Thus, in block 840, target eNodeB 804 provides to MME 240 a "Path Switch Request" message on the S1 layer.

In block 846, MME 240 sends to SGW 210 a "Modify Bearer Request" signal, which instructs SGW 210 to modify its forwarding tables so that packets are delivered to target eNodeB 804 instead of source HeNB 802. This effectively modifies the downlink path.

In block 850, SGW 210 sends to MME 240 a "Modify Bearer Response," indicating that it acknowledges the change.

In block 852, MME 240 sends to target eNodeB 804 a Path Switch Request Acknowledge message.

Figure 8D:
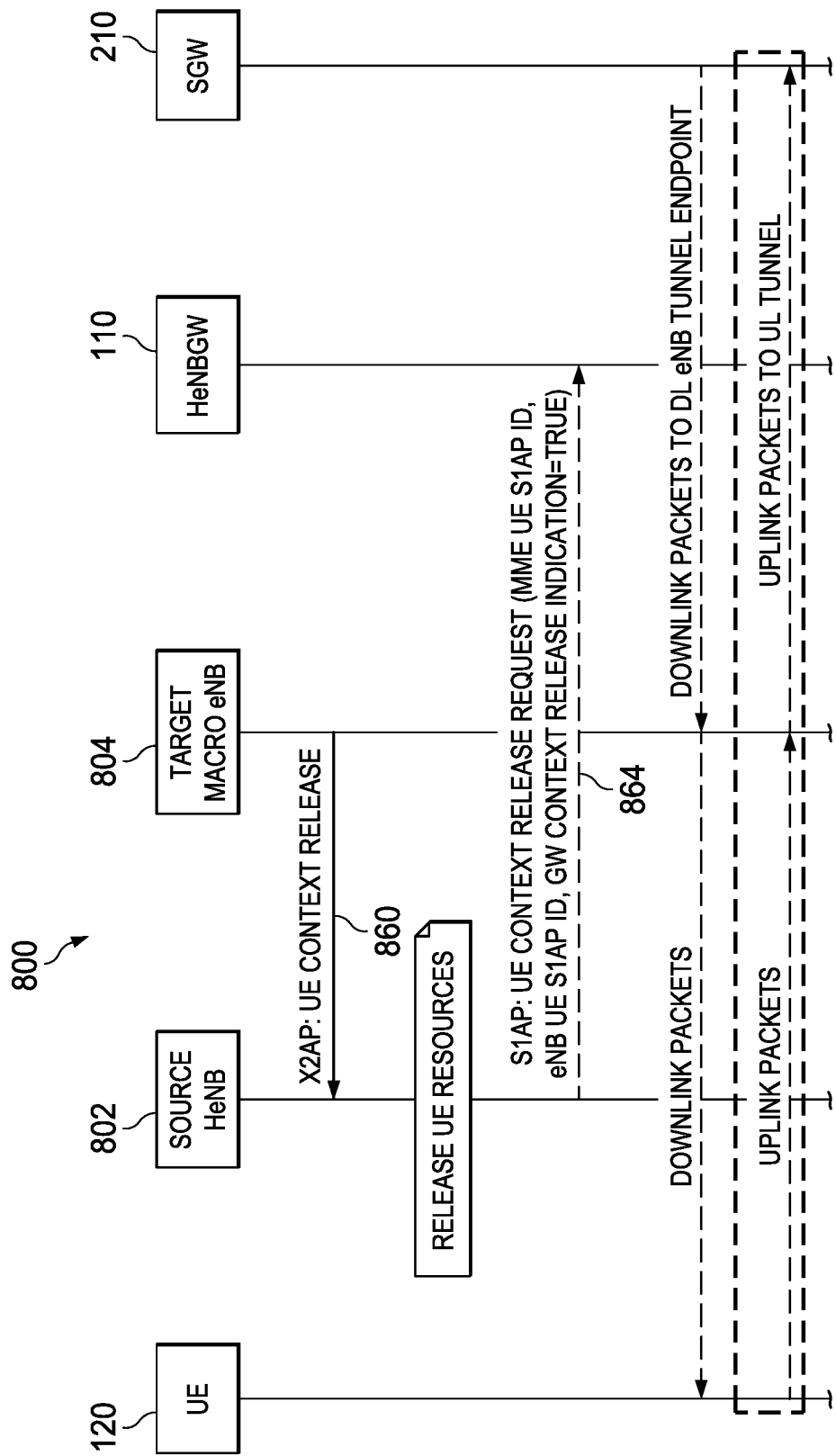

FIG. 8D is a continuation of method 800.

Because the handover is complete, source HeNB 802 no longer needs to maintain resources for UE 120. Thus, in block 860, target eNodeB 804 sends to source HeNB 802 a "UE Context Release" message on the X2 plane. This informs source HeNB 802 that it is free to release resources allocated to UE 120.

In block 864, source HeNB 802 sends to HeNGBW 110 a UE Context Release message on the S1 plane, indicating that HeNBGW 110 may also release resources allocated to UE 120.

The uplink packet flow is now as follows: UE 120→Target eNodeB 804→SGW UL TE→SGW 210.

The downlink packet flow is now as follows: SGW 210→eNodeB DL TE→eNodeB 804→UE 120.

Figure 9:
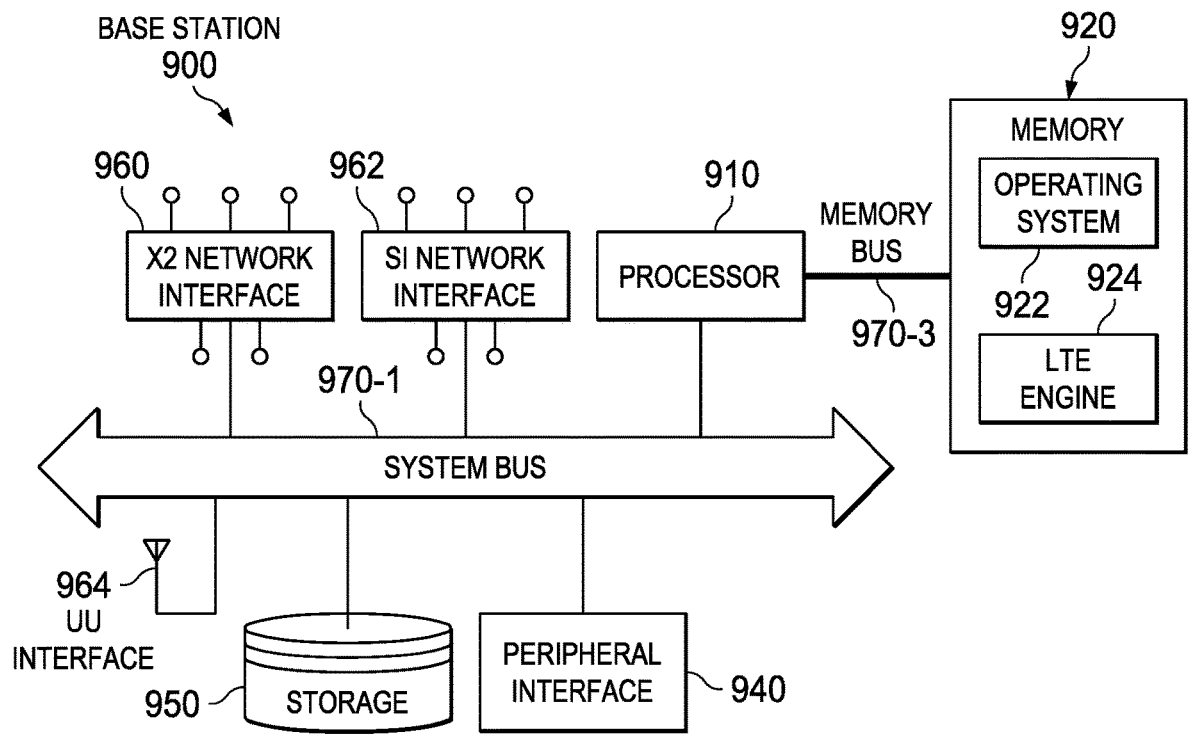
FIG. 9 is a block diagram of a base station according to one or more examples of the present Specification.

FIG. 9 is a block diagram of a base station 900 according to one or more examples of the present Specification. In various embodiments, a "base station" may be or comprise any suitable computing device configured to perform the services of a base station, such as a HeNB or eNodeB.

Base station 900 includes a processor 910 connected to a memory 920, having stored therein executable instructions for providing an operating system 922 and LTE engine 924. Other components of base station 900 include a storage 950, peripheral interface 940, X2 network interface 960, S1 network interface 962, and UU Interface 964.

In an example, processor 910 is communicatively coupled to memory 920 via memory bus 970-3, which may be for example a direct memory access (DMA) bus. Processor 910 may be communicatively coupled to other devices via a system bus 970-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a base station, or between base stations. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 910 may be connected to memory 920 in a DMA configuration via DMA bus 970-3. To simplify this disclosure, memory 920 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 920 may comprise a relatively low-latency volatile main memory, while storage 950 may comprise a relatively higher-latency non-volatile memory. However, memory 920 and storage 950 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 950 may be any species of memory 920, or may be a separate device, such as a hard drive, solid-state drive, external storage, redundant array of independent disks (RAID), network-attached storage, optical storage, tape drive, backup system, cloud storage, or any combination of the foregoing. Storage 950 may be, or may include therein, a database or databases or data stored in other configurations, and may include a stored copy of operational software such as an operating system and a copy of operating system 922 and LTE engine 924. Many other configurations are also possible, and are intended to be encompassed within the broad scope of this Specification.

X2 network interface 960 may be any suitable network interface providing connectivity to the X2 network layer, and in one example is a high-reliability physical network connection. S1 network interface 962 may be any suitable network interface providing connectivity to the S1 network layer, and in one example is a high-reliability physical network connection. UU network interface 964 may be any suitable network interface providing connectivity to UE 120, and in an example is a wireless network interface.

Operating system 922 may provide low-level hardware access methods, scheduling, and other services. LTE engine 924, in one example, is a utility or program that carries out LTE-related methods, including parts of methods 700 and 800 disclosed herein. It should be noted that LTE engine 924 is provided by way of non-limiting example only, and that other software, including interactive or user-mode software, may also be provided in conjunction with, in addition to, or instead of LTE engine 924 to perform methods according to this Specification.

In one example, LTE engine 924 includes executable instructions stored on a non-transitory medium operable to perform relevant portions of methods 700 and 800, or a similar method according to this Specification. At an appropriate time, such as upon booting base station 900 or upon a command from the operating system or a user, processor 910 may retrieve a copy of LTE engine 924 from storage 950 and load it into memory 920. Processor 910 may then iteratively execute the instructions of LTE engine 924.

Peripheral interface 940 is provided to connect to peripherals, including any auxiliary device that connects to base station 900 but that is not necessarily a part of the core architecture of base station 900. A peripheral may be operable to provide extended functionality to base station 900, and may or may not be wholly dependent on base station 900. In suitable cases, a peripheral may be a separate computing device or another base station. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 10:
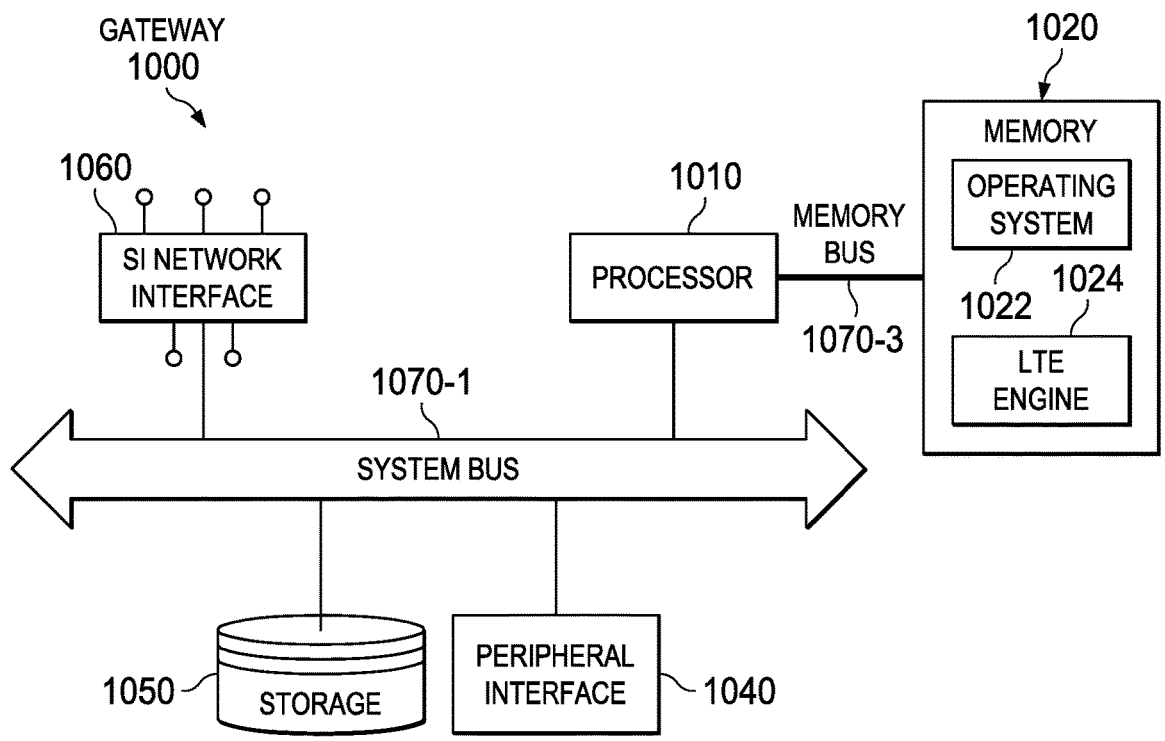
FIG. 10 is a block diagram of a gateway according to one or more examples of the present Specification.

FIG. 10 is a block diagram of a gateway 1000 according to one or more examples of the present Specification. In various embodiments, a "gateway" may be or comprise any suitable computing device configured to perform the services of a gateway, such as a HeNBGW, SGW, or SeGW. In discussing gateway 1000, the definitions and examples provided in relation to FIG. 9 should be considered as equally applicable.

Gateway 1000 includes a processor 1010 connected to a memory 1020, having stored therein executable instructions for providing an operating system 1022 and LTE engine 1024. Other components of gateway 1000 include a storage 1050, peripheral interface 1040, and S1 network interface 1060.

In an example, processor 1010 is communicatively coupled to memory 1020 via memory bus 1070-3, which may be for example a direct memory access (DMA) bus. Processor 1010 may be communicatively coupled to other devices via a system bus 1070-1.

Processor 1010 may be connected to memory 1020 in a DMA configuration via DMA bus 1070-3. To simplify this disclosure, memory 1020 is disclosed as a single logical block, but in a physical embodiment may include one or more blocks of any suitable volatile or non-volatile memory technology or technologies. It should also be noted that although DMA is disclosed by way of non-limiting example, DMA is not the only protocol consistent with this Specification, and that other memory architectures are available.

Storage 1050 may be any species of memory 1020, or may be a separate device, and may include a stored copy of operational software such as an operating system and a copy of operating system 1022 and LTE engine 1024. Many other configurations are also possible, and are intended to be encompassed within the broad scope of this Specification.

S1 network interface 1060 may be any suitable network interface providing connectivity to the S1 network layer, and in an example is a high reliability physical network connection.

Operating system 1022 may provide low-level hardware access methods, scheduling, and other services. LTE engine 1024, in one example, is a utility or program that carries out LTE-related methods, including parts of methods 700 and 800 disclosed herein. It should be noted that LTE engine 1024 is provided by way of non-limiting example only, and that other software, including interactive or user-mode software, may also be provided in conjunction with, in addition to, or instead of LTE engine 1024 to perform methods according to this Specification.

In one example, LTE engine 1024 includes executable instructions stored on a non-transitory medium operable to perform relevant portions of methods 700 and 800, or a similar method according to this Specification. At an appropriate time, such as upon booting gateway 1000 or upon a command from the operating system or a user, processor 1010 may retrieve a copy of LTE engine 1024 from storage 1050 and load it into memory 1020. Processor 1010 may then iteratively execute the instructions of LTE engine 1024.

Peripheral interface 1040 is provided to connect to peripherals as necessary.

Figure 11:
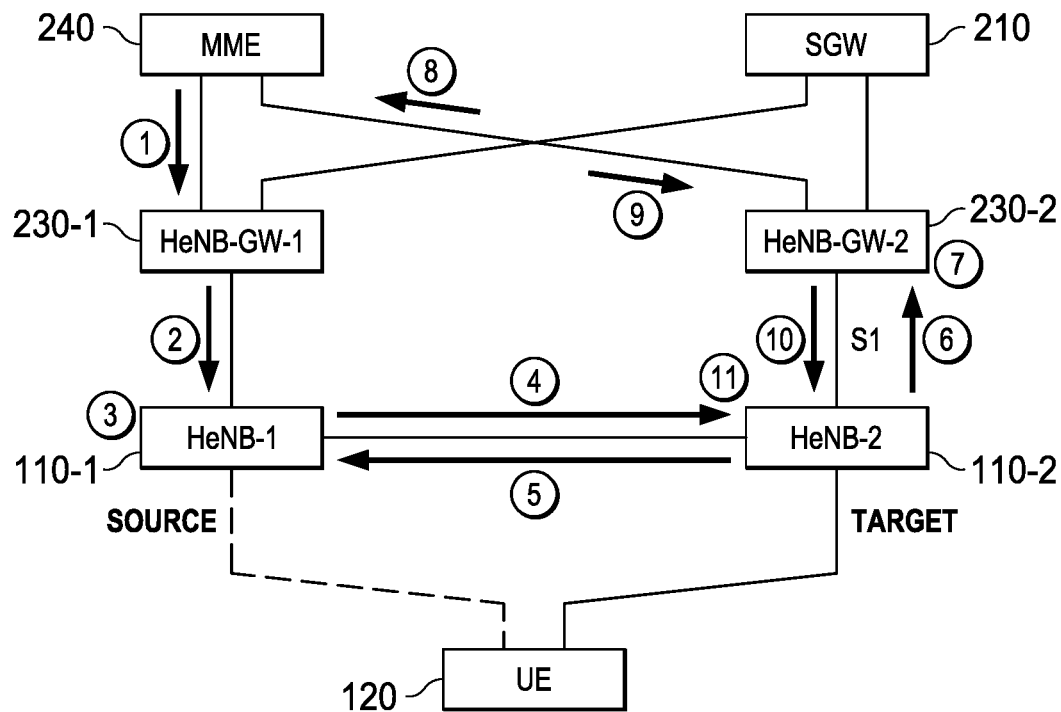
FIG. 11 is a network diagram of a telecommunication network according to one or more examples of the present Specification.

FIG. 11 is a block diagram of a telecommunication network according to one or more examples of the present Specification. The example of FIG. 11 illustrates an example of X2 handover between HeNB-1 110-1 and HeNB-2 110-2. For ease of reference, each message shown in FIG. 11 is assigned an ordinal number. It should be understood, however, that the specific messages disclosed herein are provided by way of example only. In certain embodiments, one or more of the disclosed messages may be optional or unnecessary, while in some embodiments other messages may also be provided in addition to or in conjunction with those disclosed here.

The message passing of FIG. 11 may be summarized as follows:

1. MME 240 sends to HeNBGW-1 230-1 message S1AP: Initial Context Setup Request Message or E-RAB Setup Request Message. This may include the IP address of SGW 210, which may be provided in the transport layer address (TLA) field. This may also include a GTP-TEID field, which points to SGW 210.

> S1AP: Initial context setup request msg (or E-RAB setup request msg)
> >E-RABs to be setup list IE
> >>ERAB to be setup item IEs
> >>>E-RAB ID
> >>>...
> >>>TLA (transport layer address) [SGW IP addr]
> >>>GTP-TEID (tunnel endpoint ID) [points to SGW]

2. HeNBGW-1 230-1 forwards to HeNB-1 110-1 the S1AP message. Before forwarding, HeNBGW 230-1 may add one or more extra IEs. This may include a TLA field, including the IP address for HeNBGW-1 110-1 (the "local tunnel"), and the GTP-TEID, which also points to HeNBGW. It may further include a TLA2 field, which points to the IP address of SGW 210, and a GTP-TEID2 field, which also points to SGW 210.

> S1AP: Initial context setup request msg (or E-RAB setup request msg)
> >E-RABs to be setup list IE
> >>ERAB to be setup item IEs
> >>>E-RAB ID
> >>>...
> >>>TLA [HeNBGW1 IP addr ("local UL tunnel")]
> >>>GTP-TEID [points to HeNBGW-1]
> >>>TLA2 [SGW IP addr]
> >>>GTP-TEID2 [points to SGW]

3. A handover trigger occurs on HeNB-1 110-1. This may occur, for example, because UE 120 is moving out of range of HeNB-1 110-1 and into range of HeNB-2 110-2.
4. HeNB-1 110-1 sends to HeNB-2 110-2 message X2AP: Handover Request Message. In this message, the TLA and GTP-TEID fields are populated respectively with the values of TLA2 and the GTP-TEID2 obtained in the S1AP initial context setup or E-RAB setup request message (see (1) and (2) above).

> X2AP: Handover Request Msg
> >E-RABs to be setup list IE
> >>ERAB to be setup item IEs
> >>>E-RAB ID
> >>>...
> >>>UL GTP Tunnel Endpoint
> >>>>TLA [SGW IP addr]
> >>>>GTP-TEID [points to SGW]

5. HeNB-2 110-2 sends to HeNB-1 110-1 message X2AP: Handover Request acknowledge message.

> X2AP: Handover Request ACK Msg
> >E-RABs admitted list IE
> >>ERABs admitted item IEs
> >>>E-RAB ID
> >>>...
> >>>UL GTP Tunnel Endpoint
> >>>DL GTP Tunnel Endpoint 6. HeNB-2 110-2 sends to HeNBGW-2 230-2 message S1AP: Path Switch Request Message. This message includes two IEs: E-RABs to be Switched in DL list IE, and E-RABs to be switched in UL list IE. HeNB-2 110-2 passes along the TLA and GTP-TEID IE values in "E-RAB to be switched in UL List IE" (new IE) as they were received from HeNB-1 110-1. In other words, HeNB-2 110-2 has received TLA2 and GTP-TEID2 as the new values for the fields TLA and GTP-TEID, so that TLA now points to the IP address of SGW 210, and GTP-TEID points to SGW 210.

> S1AP: Path Switch Request Msg
> >E-RABs to be switched in DL list IE
> >>E-RABs to be switched in DL item IEs
> >>E-RAB ID
> >>>TLA
> >>>GTP-TEID
> >E-RABs to be switched in UL list IE
> >>E-RABs to be switched in UL item IEs
> >>>E-RAB ID
> >>>TLA2 [SGW IP addr]
> >>>GTP-TEID2 [points to SGW]

7. HeNBGW-2 230-2 establishes a UL tunnel to SGW 210. Because HeNB-2 110-2 is using the new IE values (TLA2 and GTP-TEID2), it successfully establishes the tunnel with SGW 210, instead of unsuccessfully trying to establish a tunnel with HeNBGW-1 230-1, with which it has no connection. This result is accomplished without HeNB-2 110-2 needing to be aware that HeNBGW-1 230-1 held two separate values for TLA and GTP-TEID. Thus, the handoff may be successful even if HeNB-2 110-2 is a previously known HeNB that is not aware of the methods disclosed in this Specification.
8. HeNBGW-2 230-2 forwards to MME 240 message S1AP: Path Switch Request Message. However, before forwarding the packet, HeNBGW-2 230-2 strips out "E-RAB to be Switched in UL List IE" (which in this case is the new IE).

> S1AP: Path Switch Request Msg
> >E-RABs to be switched in DL list IE
> >>E-RABs to be switched in DL item IEs
> >>>E-RAB ID
> >>>TLA
> >>>GTP-TEID 9. MME 240 sends to HeNBGW-2 230-2 message S1AP: Path Switch Request Acknowledge message. If there is a change in serving gateway (for example, to or from SGW 210), then MME 240 also provides a new "E-RAB to be Switched in UL List IE" (TLA and GTP TEID pair). If there has been no change in the serving gateway, then this portion is omitted.
10. If there has been a change in serving gateway, then HeNBGW-2 230-2 establishes a GTP tunnel to the new serving gateway and removes the old tunnel. If there has not been a change in serving gateway, then the tunnel established at (7) above is maintained. HeNBGW-2 230-2 then sends to HeNB-2 110-2 its local UL TEID.

```
S1AP: Path Switch Request Msg Ack
>E-RABs to be switched in UL List IE
>>E-RABs to be switched in UL item IEs
>>>E-RAB ID
>>>TLA [HeNBGW2's IP addr, "local tunnel"]
>>>GTP-TEID [points to HeNBGW2 (similar to "swap"
operation in (2) above)]
```

11. HeNB-2 110-2 establishes a GTP tunnel to HeNBGW-2 230-2, using the local UL tunnel provided in (10) above.

After this procedure, there is a GTP tunnel established between HeNB-2 110-2 and HeNBGW-2 230-2 (established in (11) above), and a GTP tunnel between HeNBGW-2 230-2 and SGW 210 (established in (7) above).

Figure 12:
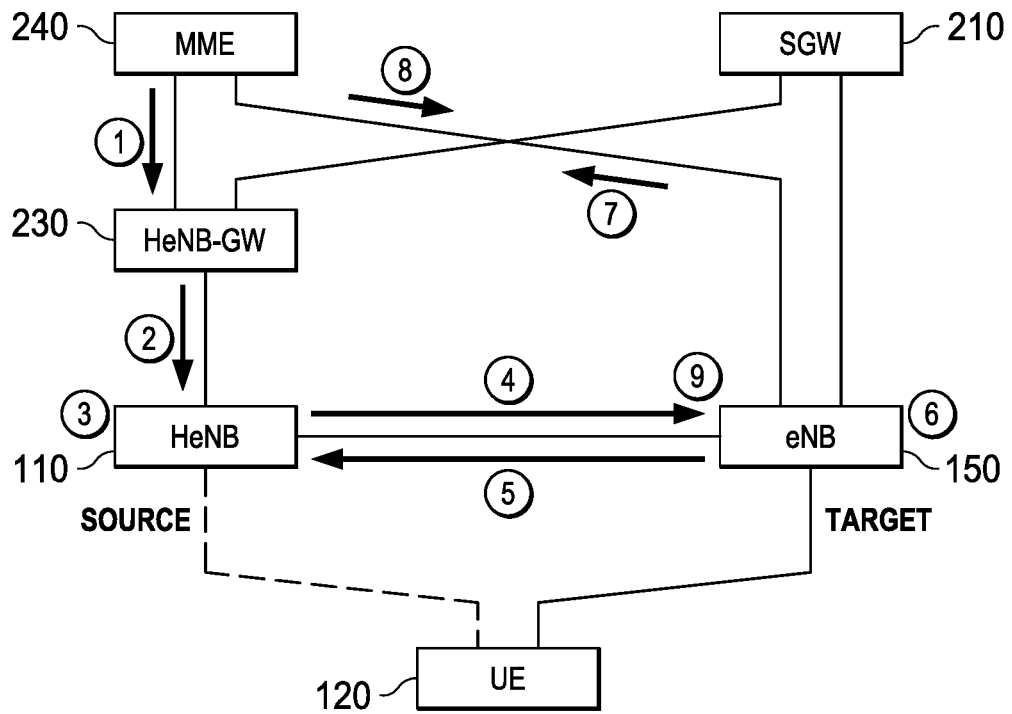
FIG. 12 is a network diagram of a telecommunication network according to one or more examples of the present Specification.

FIG. 12 is a block diagram of a telecommunication network according to one or more examples of the present Specification. The example of FIG. 12 illustrates an example of X2 handover between HeNB 110 and eNodeB 150. For ease of reference, each message shown in FIG. 12 is assigned an ordinal number. It should be understood, however, that the specific messages disclosed herein are provided by way of example only. In certain embodiments, one or more of the disclosed messages may be optional or unnecessary, while in some embodiments other messages may also be provided in addition to or in conjunction with those disclosed here.

The message passing of FIG. 12 may be summarized as follows:

1. MME 240 sends to HeNBGW 230 message S1AP Initial Context Setup Request Message or E-RAB Setup Request Message. This may include the IP address of SGW 210, which may be provided in the transport layer address (TLA) field. This may also include a GTP-TEID field, which points to SGW 210.

```
S1AP: Initial context setup request msg (or E-RAB
setup request msg)
>E-RABs to be setup list IE
>>ERAB to be setup item IEs
>>>E-RAB ID
>>>...
>>>TLA (transport layer address) [SGW IP addr]
>>>GTP-TEID (tunnel endpoint ID) [points to SGW]
```

2. HeNBGW 230 forwards to HeNB 110 the S1AP message. Before forwarding, HeNBGW 230-1 may add one or more extra IEs. This may include a TLA field, including the IP address for HeNBGW-1 110-1 (the "local tunnel"), and the GTP-TEID, which also points to HeNBGW. It may further include a TLA2 field, which points to the IP address of SGW 210, and a GTP-TEID2 field, which also points to SGW 210.

```
S1AP: Initial context setup request msg (or E-RAB
setup request msg)
>E-RABs to be setup list IE
>>ERAB to be setup item IEs
>>>E-RAB ID
>>>...
>>>TLA [HeNBGW1 IP addr ("local UL tunnel")]
>>>GTP-TEID [points to HeNBGW-1]
>>>TLA2 [SGW IP addr]
>>>GTP-TEID2 [points to SGW]
```

3. A handover trigger occurs on HeNB 110. This may occur, for example, because UE 120 is moving out of range of HeNB 110 and into range of eNodeB 150.

4. HeNB 110 sends to eNodeB 150 message X2AP Handover Request Message. In this message, the TLA and GTP-TEID fields are populated respectively with the values of TLA2 and the GTP-TEID2 obtained in the S1AP initial context setup or E-RAB setup request message (see (1) and (2) above).

```
X2AP: Handover Request Msg
>E-RABs to be setup list IE
>>ERAB to be setup item IEs
>>>E-RAB ID
>>>...
>>>UL GTP Tunnel Endpoint
>>>>TLA [SGW IP addr]
>>>>GTP-TEID [points to SGW]
```

5. eNodeB 150 sends to HeNB 110 message X2AP Handover Request Acknowledge message.

```
X2AP: Handover Request ACK Msg
>E-RABs admitted list IE
>>ERABs admitted item IEs
>>>E-RAB ID
>>>...
>>>UL GTP Tunnel Endpoint
>>>DL GTP Tunnel Endpoint
```

6. eNodeB 150 establishes a GTP tunnel with SGW 210, as indicated by the UL GTP Tunnel Endpoint IE in (4) above.

7. eNodeB 150 sends to MME 240 message S1AP: Path Switch Request Message. This message includes only one IE because the target is a macro eNodeB instead of an HeNB.

```
S1AP: Path Switch Request Msg
>E-RABs to be switched in DL list IE
>>E-RABs to be switched in DL item IEs
>>>E-RAB ID
>>>TLA
>>>GTP-TEID
```

8. MME 240 sends to eNodeB 150 message S1AP: Path Switch Request Acknowledge message. If there is a change in serving gateway (for example, to or from SGW 210), then MME 240 also provides a new "E-RAB to be Switched in UL List IE" (TLA and GTP TEID pair). If there has been no change in the serving gateway, then this portion is omitted.

9. If there has been a change in serving gateway, then eNodeB 150 establishes a GTP tunnel to the new serving gateway and removes the old tunnel. If there has not been a change in serving gateway, then the tunnel established at (6) above is maintained.

After this procedure, there is a GTP tunnel established between eNodeB 150 and SGW 210 (established in (6) or (9) above).

Figure 13:
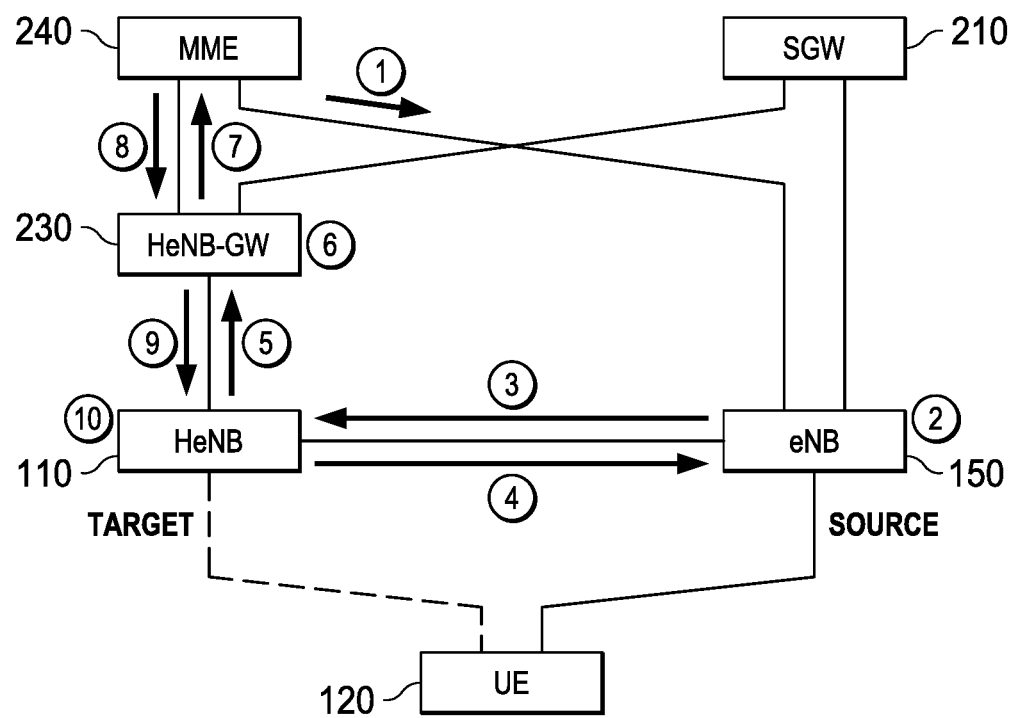
FIG. 13 is a network diagram of a telecommunication network according to one or more examples of the present Specification.

FIG. 13 is a block diagram of a telecommunication network according to one or more examples of the present Specification. The example of FIG. 13 illustrates an example of X2 handover between eNodeB 150 and HeNB 110. For ease of reference, each message shown in FIG. 13 is assigned an ordinal number. It should be understood, however, that the specific messages disclosed herein are provided by way of example only. In certain embodiments, one or more of the disclosed messages may be optional or unnecessary, while in some embodiments other messages may also be provided in addition to or in conjunction with those disclosed here.

The message passing of FIG. 13 may be summarized as follows:

1. MME 240 sends to eNodeB 150 message S1AP: Initial Context Setup Request Mesaage or E-RAB Setup Request Message. This may include the IP address of SGW 210, which may be provided in the transport layer address (TLA) field. This may also include a GTP-TEID field, which points to SGW 210.

```
S1AP: Initial context setup request msg (or E-RAB
setup request msg)
>E-RABs to be setup list IE
>>ERAB to be setup item IEs
>>>E-RAB ID
>>>...
>>>TLA (transport layer address) [SGW IP addr]
>>>GTP-TEID (tunnel endpoint ID) [points to SGW]
```

2. A handover trigger occurs on eNodeB 150. This may occur, for example, because UE 120 is moving out of range of eNodeB 150 and into range of HeNB 110.
3. eNodeB 150 sends to HeNB 110 message X2AP: Handover Request Message. In this message, the TLA and GTP-TEID fields are populated respectively with the values of TLA and the GTP-TEID obtained in the S1AP Initial Context Setup or E-RAB Setup Request Message (see (1) above).

```
X2AP: Handover Request Msg
>E-RABs to be setup list IE
>>ERAB to be setup item IEs
>>>E-RAB ID
>>>...
>>>UL GTP Tunnel Endpoint
>>>>TLA [SGW IP addr]
>>>>GTP-TEID [points to SGW]
```

4. HeNB 110 sends to eNodeB 150 message X2AP: Handover Request Acknowledge message.

```
X2AP: Handover Request ACK Msg
>E-RABs admitted list IE
>>ERABs admitted item IEs
>>>E-RAB ID
>>>...
>>>UL GTP Tunnel Endpoint
>>>DL GTP Tunnel Endpoint
```

5. HeNB 110 sends to HeNBGW 230 message S1AP: Path Switch Request Message. This message includes two IEs: E-RABs to be Switched in DL list IE, and E-RABs to be switched in UL list IE. HeNB 110 passes along the TLA and GTP-TEID IE values in "E-RAB to be switched in UL List IE" (new IE).

```
S1AP: Path Switch Request Msg
>E-RABs to be switched in DL list IE
>>E-RABs to be switched in DL item IEs
>>E-RAB ID
>>>TLA
>>>GTP-TEID
>E-RABs to be switched in UL list IE
>>E-RABs to be switched in UL item IEs
>>>E-RAB ID
>>>TLA2 [SGW IP addr]
>>>GTP-TEID2 [points to SGW]
```

6. HeNBGW 230 establishes a UL tunnel to SGW 210 using the new IE values received in (5) above. Because HeNBGW 230 is using the new IE values (TLA and GTP-TEID), it successfully establishes the tunnel with SGW 210.
7. HeNBGW 230 forwards to MME 240 message S1AP: Path Switch Request Message. However, before forwarding the packet, HeNBGW 230 strips out "E-RAB to be Switched in UL List IE" (which in this case is the new IE).

```
S1AP: Path Switch Request Msg
>E-RABs to be switched in DL list IE
>>E-RABs to be switched in DL item IEs
>>>E-RAB ID
>>>TLA
>>>GTP-TEID
```

8. MME 240 sends to HeNBGW-2 230-2 message S1AP: Path Switch Request Acknowledge message.
9. HeNBGW 230 sends to HeNB 110 message S1AP: Path Switch Request Acknowledge Message. The IE used is an existing IE, which HeNBGW 230 inserts irrespective of whether or not it is present in the message it received in (8) above.

```
S1AP: Path Switch Request Msg Ack
>E-RABs to be switched in UL List IE
>>E-RABs to be switched in UL item IEs
>>>E-RAB ID
>>>TLA [HeNBGW's IP addr, "local tunnel"]
>>>GTP-TEID [points to HeNBGW (similar to "swap"
operation in (2) of FIGURE 11)]
```

10. HeNB 110 establishes a local GTP tunnel to HeNBGW 230, using the local UL tunnel provided in (9) above.

After this procedure, there is a local GTP tunnel established between HeNB 110 and HeNBGW 230 (established in (10) above), and a GTP tunnel between HeNBGW 230 and SGW 210 (established in (6) above).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-message, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips. Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

In example implementations, at least some portions of the processing activities outlined herein may also be implemented in software. In some embodiments, one or more of these features may be implemented in hardware provided external to the elements of the disclosed FIGURES, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the Specification, to limit this disclosure in any way that is not otherwise reflected in the appended claims.

What is claimed is:

1. A base station to maintain mobile device connectivity during handover between base stations connected to different gateways, the base station comprising:
one or more computer processors;
a first network interface operable to connect the base station to a first network, wherein the base station is a source base station;
a second network interface operable to connect the base station to a second network comprising a target base station; and
a memory containing a program executable by the one or more computer processors to, upon determining that a mobile device on the first network has a distance-attenuated signal to the source base station, perform a handover of the mobile device from the source base station to the target base station, comprising:
upon a determination that the source and target base stations are connected to a same gateway, providing an uplink tunnel endpoint (UTE) identifier of the gateway in a UTE field of a handover request, the handover request specifying an address of a serving gateway with which to establish a virtual tunnel endpoint, wherein the handover request is sent to the target base station; and
upon a determination that the source and target base stations are connected to different gateways including first and second gateways, respectively, the first gateway comprising the serving gateway, selecting a UTE identifier of the second gateway to include in the UTE field of the handover request, in order to prevent, during the handover, a connection failure resulting from the target base station failing to establish the virtual tunnel endpoint to the serving gateway due to connectivity via an intermediate gateway, wherein the handover request is sent to the target base station.

2. The base station of claim 1, wherein each of the first and second gateways has a respective UTE identifier of a plurality of UTE identifiers, wherein the UTE identifier of the second gateway is selected from the plurality of UTE identifiers, the connection failure resulting from the target base station failing to establish the virtual tunnel endpoint to the serving gateway because the target base station is connected to the serving gateway via the intermediate gateway, wherein the intermediate gateway is configured to aggregate user plane traffic between the mobile device and the serving gateway;
wherein the intermediate gateway is connected to a mobility management entity and the serving gateway, wherein the intermediate gateway aggregates: (i) control plane traffic between the mobile device and the mobility management entity and (ii) user plane traffic between the mobile device and the serving gateway.

3. The base station of claim 2, wherein at least one of the source and target base stations is a home eNodeB (HeNB), wherein the second gateway comprises a HeNB gateway (HeNBGW), wherein the first network is a long-term evolution (LTE) S1 network, wherein the second network is an LTE X2 network.

4. The base station of claim 3, wherein the handover request comprises a first handover request, wherein the program is further executable to:
receive a second handover request from a third base station on the second network;
acknowledge the second handover request; and
deliver a path switch request on the first network;
wherein the base station is operable to provide services as, in respective instances, an eNodeB and a home eNodeB.

5. The base station of claim 4, wherein the source base station comprises a source HeNB, wherein the target base station comprises a target HeNB, the source and target HeNBs including the HeNB, wherein the first handover request comprises an X2 handover request.

6. The base station of claim 1, wherein the program is further executable to:
receive a handover request from a third base station on the second network; acknowledge the received handover request; and
deliver a path switch request on the first network.

7. The base station of claim 1, wherein the first network is a long-term evolution (LTE) S1 network.

8. The base station of claim 1, wherein the second network is a long-term evolution (LTE) X2 network.

9. The base station of claim 1, further comprising a base station engine operable to provide services as one of an eNodeB and a home eNodeB.

10. One or more tangible, non-transitory computer-readable mediums having stored thereon executable instructions operable to instruct one or more computer processors to perform an operation to maintain mobile device connectivity during handover between base stations connected to different gateways, the instructions including:
instructions to, upon determining that a mobile device on a first network has a distance-attenuated signal to a source base station, perform a handover of the mobile device from the source base station to a target base station, comprising:
instructions to, upon a determination that the source and target base stations are connected to a same gateway, provide an uplink tunnel endpoint (UTE) identifier of the gateway in a UTE field of a handover request, the handover request specifying an address of a serving gateway with which to establish a virtual tunnel endpoint, wherein the handover request is sent to the target base station; and
instructions to, upon a determination that the source and target base stations are connected to different gateways including first and second gateways, respectively, the first gateway comprising a serving gateway, select a UTE identifier of the second gateway to include in the UTE field of the handover request, in order to prevent, during the handover, a connection failure resulting from the target base station failing to establish the virtual tunnel endpoint to the serving gateway due to connectivity via an intermediate gateway, wherein the handover request is sent to the target base station.

11. The one or more tangible, non-transitory computer readable mediums of claim 10, wherein the instructions are further operable to instruct the one or more computer processors to:
receive a handover request from a third base station on a second network; acknowledge the received handover request; and
deliver a path switch request on the first network.

12. The one or more tangible, non-transitory computer readable mediums of claim 11, wherein the first network is a long-term evolution (LTE) S1 network.

13. The one or more tangible, non-transitory computer readable mediums of claim 11, wherein the second network is a long-term evolution (LTE) X2 network.

14. The one or more tangible, non-transitory computer readable mediums of claim 10, wherein the instructions are further operable to provide a base station engine operable to provide services as one of an eNodeB and a home eNodeB.

15. A mobile communication network gateway comprising a serving gateway to maintain user equipment connectivity during handover between base stations connected to different gateways, the serving gateway comprising:
one or more computer processors;
a network interface operable to communicatively couple a device to a network; and
a memory containing a program executable by the one or more computer processors to:
receive on the network a request to modify a bearer from a source base station to a target base station, wherein a user equipment connected to the source base station experiences a distance-attenuated signal that triggers a handover from the source base station to the target base station, the handover having an associated handover request designating an address of a serving gateway with which to establish a virtual tunnel endpoint;
upon a determination that the source and target base stations are connected to a same gateway, generate a response identifying the gateway, after which the response is sent to the network; and
upon a determination that the source and target base stations are connected to different gateways including first and second gateways, respectively, the first gateway comprising the serving gateway, selecting an identifier of the second gateway to include in a response to the request, in order to prevent, during the handover, a connection failure resulting from the target base station failing to establish the virtual tunnel endpoint to the serving gateway due to connectivity via an intermediate gateway, wherein the response is sent to the network.

16. The mobile communication network gateway of claim 15, wherein the program is further executable to:

determine that the source base station is a home eNodeB connected to a home eNodeB gateway; and
provide tunnel endpoint data for forming a tunnel endpoint to another home eNodeB gateway or to the serving gateway.

17. The mobile communication network gateway of claim 15, wherein the program is further executable to:
determine that the source base station is an eNodeB base station with a tunnel endpoint to the serving gateway and the target base station is a home eNodeB base station; and
provide tunnel endpoint data for forming a tunnel endpoint to a home eNodeB gateway.

18. One or more tangible, non-transitory computer-readable mediums having stored thereon executable instructions operable to instruct one or more computer processors to perform an operation to maintain user equipment connectivity during handover between base stations connected to different gateways, the operation comprising:
providing a network interface operable to communicatively couple a device to a network;
receiving via the network a request to modify a bearer from a source base station to a target base station, wherein a user equipment connected to the source base station experiences a distance-attenuated signal that triggers a handover from the source base station to the target base station, the handover request specifying an address of a serving gateway to establish a virtual tunnel endpoint to;
upon a determination that the source and target base stations are connected to a same gateway, generating a response identifying the gateway, after which the response is sent to the network; and
upon a determination that the source and target base stations are connected to different gateways including first and second gateways, respectively, the first gateway comprising the serving gateway, selecting an identifier of the second gateway to include in a response to the request, in order to prevent, during the handover, a connection failure resulting from the target base station failing to establish the virtual tunnel endpoint to the serving gateway due to connectivity via an intermediate gateway, wherein the response is sent to the network.

19. The one or more tangible, non-transitory medium of claim 18, wherein the instructions are further operable to instruct the one or more computer processors to:
determine that the source base station is a home eNodeB connected to a home eNodeB gateway; and
provide tunnel endpoint data for forming a tunnel endpoint to another home eNodeB gateway or to the serving gateway.

20. The one or more tangible, non-transitory medium of claim 18, wherein the instructions are further operable to instruct the one or more computer processors to:
determine that the source base station is an eNodeB base station with a tunnel endpoint to the serving gateway and the target base station is a home eNodeB base station; and
provide tunnel endpoint data for forming a tunnel endpoint to a home eNodeB gateway.

* * * * *

UNITED STATES PATENT AND TRADEMARK OFFICE
CERTIFICATE OF CORRECTION

PATENT NO. : 10,757,610 B2
APPLICATION NO. : 16/058798
DATED : August 25, 2020
INVENTOR(S) : Takahito Yoshizawa et al.

Page 1 of 1

It is certified that error appears in the above-identified patent and that said Letters Patent is hereby corrected as shown below:

On the Title Page

In item (56), in Column 2, under "Other Publications", Line 1, delete "Intelletual" and insert -- Intellectual --, therefor.

In item (56), in Column 2, under "Other Publications", Line 1, delete "Adminstration," and insert -- Administration, --, therefor.

On the page 2, in Column 2, under "Other Publications", Line 15, delete "involding" and insert -- involving --, therefor.

In the Specification

In Column 1, Line 26, delete "time" and insert -- time. --, therefor.

In Column 1, Line 32, delete "+(3G+)" and insert -- + (3G+) --, therefor.

In Column 4, Line 9, delete "3rd" and insert -- 3$^{rd}$ --, therefor.

In Column 4, Line 32, delete "51" and insert -- S1 --, therefor.

In Column 7, Line 33, delete "110-2" and insert -- 110-2. --, therefor.

In Column 10, Line 2, delete "51" and insert -- S1 --, therefor.

In Column 11, Line 17, delete "HeNGBW" and insert -- HeNBGW --, therefor.

In Column 12, Line 16, delete "HeNGBW" and insert -- HeNBGW --, therefor.

In Column 19, Line 7, delete "Mesaage" and insert -- Message --, therefor.

Signed and Sealed this
Third Day of November, 2020

Andrei Iancu
*Director of the United States Patent and Trademark Office*